(12) United States Patent
Takami et al.

(10) Patent No.: US 7,228,926 B2
(45) Date of Patent: Jun. 12, 2007

(54) APPARATUS FOR CONTROLLING HYBRID VEHICLE

(75) Inventors: Shigeki Takami, Anjo (JP); Kiyotomo Miura, Anjo (JP); Satoru Wakuta, Anjo (JP)

(73) Assignee: Aisin AW Co., Ltd., Anjo (JP)

(*) Notice: Subject to any disclaimer, the term of this patent is extended or adjusted under 35 U.S.C. 154(b) by 259 days.

(21) Appl. No.: 10/910,468

(22) Filed: Aug. 4, 2004

(65) Prior Publication Data

US 2005/0029024 A1 Feb. 10, 2005

(30) Foreign Application Priority Data

Aug. 8, 2003 (JP) .............................. 2003-206957

(51) Int. Cl.
*B60K 1/00* (2006.01)
*B60K 6/00* (2006.01)
*B60L 11/00* (2006.01)
*G06F 7/00* (2006.01)

(52) U.S. Cl. ................. 180/65.2; 180/65.3; 701/22; 903/940; 903/941; 903/942

(58) Field of Classification Search ............. 180/65.2, 180/65.3; 701/22; 903/940, 941, 942
See application file for complete search history.

(56) References Cited

U.S. PATENT DOCUMENTS

| | | | | |
|---|---|---|---|---|
| 5,558,588 A | * | 9/1996 | Schmidt | 475/5 |
| 5,558,595 A | * | 9/1996 | Schmidt et al. | 477/3 |
| 5,730,676 A | * | 3/1998 | Schmidt | 475/5 |
| 5,903,061 A | * | 5/1999 | Tsuzuki et al. | 290/40 C |
| 5,935,035 A | * | 8/1999 | Schmidt | 475/5 |
| 5,951,614 A | * | 9/1999 | Tabata et al. | 701/54 |
| 6,006,620 A | * | 12/1999 | Lawrie et al. | 74/335 |
| 6,304,814 B1 | * | 10/2001 | Masters et al. | 701/110 |
| 6,343,246 B1 | * | 1/2002 | Matsubara et al. | 701/22 |
| 6,470,983 B1 | * | 10/2002 | Amano et al. | 180/65.2 |
| 6,478,705 B1 | * | 11/2002 | Holmes et al. | 475/5 |
| 6,527,659 B1 | * | 3/2003 | Klemen et al. | 475/5 |
| 6,540,631 B2 | * | 4/2003 | Holmes | 475/5 |
| 6,551,208 B1 | * | 4/2003 | Holmes et al. | 475/5 |

FOREIGN PATENT DOCUMENTS

| | | |
|---|---|---|
| JP | A 2000-002327 | 1/2000 |
| JP | A 2002-225578 | 8/2002 |
| JP | A-2003-130203 | 5/2003 |
| JP | A-2004-203368 | 7/2004 |

* cited by examiner

Primary Examiner—Christopher P. Ellis
Assistant Examiner—John R. Olszewski
(74) Attorney, Agent, or Firm—Oliff & Berridge, PLC

(57) ABSTRACT

A control unit for a vehicle including a controller that determines whether shifting of a stepped transmission is necessary, and increases output torque of a first drive unit and decreases output torque of a second drive unit in correspondence with an increase of the output torque of the first drive unit, the increase and the decrease being performed prior to shifting of the stepped transmission when a determination is made that shifting is necessary.

33 Claims, 10 Drawing Sheets

|  | B1 | B2 |
|---|---|---|
| Hi | O | X |
| Lo | X | O |
| N | X | X |

O: ENGAGED
X: RELEASED

APPARATUS FOR CONTROLLING HYBRID VEHICLE

INCORPORATION BY REFERENCE

The disclosure of Japanese Patent Application No. 2003-206957 filed on Aug. 8, 2003 including the specification, drawings and abstract is incorporated herein by reference in its entirety.

BACKGROUND OF THE INVENTION

1. Field of Invention

The invention relates to an apparatus for controlling a hybrid vehicle (HEV) having two different drive units that supply a driving force to a transmission shaft that is connected to driving wheels.

2. Description of Related Art

In recent years, various types of hybrid vehicles have been proposed in an attempt to reduce adverse environmental effects and improve fuel economy. In a known system of such a hybrid vehicle (see, for example, Japanese Patent Publication No. 2000-002327), output from an engine and output from an electric motor are combined by a combining-distribution mechanism, and the combined output is transmitted to an input shaft through a ring gear or the like. Moreover, a synchronous coupling mechanism is controlled such that the gear ratio between the input shaft and an output shaft can be switched. In this hybrid vehicle, the synchronous coupling mechanism is operated as necessary to selectively couple (i) a low speed drive gear and the input shaft or (ii) a high speed drive gear and the input shaft, in order to switch a gear ratio between two speed stages, namely, a low speed and a high speed.

However, in the hybrid vehicle disclosed in Japanese Patent Publication No. 2000-002327, the output of the engine and the output of the electric motor are both transmitted to a differential through a transmission. Therefore, when the gear ratio of the transmission is switched by controlling the synchronous coupling mechanism, there is a transient delay in transmitting torque to the driving wheels. As a result, the driver may feel a sense of discomfort.

In an attempt to solve this problem, Japanese Patent Publication No. 2000-225578 discloses a hybrid vehicle having a first motor generator as a generator (hereinafter simply referred to as the "motor generator"); a second motor generator as a driving source (hereinafter simply referred to as the "drive motor"); a planetary gear mechanism for distributing engine output to the motor generator and the driving wheels, and for transmitting at least one of the output of the engine and the output of the drive motor to the driving wheels; and a power transmission state control apparatus for switching the output of the drive motor between a low speed state and a high speed state. According to this system of the hybrid vehicle, the power transmission state control apparatus is provided in a transmission path that is different from the path for transmitting the engine output to the driving wheels. As a result, unlike the previously described hybrid systems, the driver is not likely to feel any sense of discomfort when shifting takes place.

Specifically, in the hybrid vehicle disclosed in Japanese Patent publication No. 2000-225578, switching of the gear engagement state between the low speed state and the high speed state is performed by a stepped transmission that is provided further down the power transmission flow than the power transmission state control apparatus. Thus, even if there is a transient delay in transmitting the output of the drive motor to the driving wheels, the output of the engine is continuously transmitted to the driving wheels via a transmission path that is different from that of the power transmission state apparatus. Thus, a temporary drop in the driving force to the driving wheels is prevented, and the driver does not feel a sense of discomfort when shifting takes places.

SUMMARY OF THE INVENTION

However, when switching from the low to the high speed states with the hybrid vehicle disclosed in Japanese Patent Publication No. 2000-225578, although the engine output is continuously transmitted to the driving wheels through the transmission path that is different from that of the power transmission state control, fluctuations in the output transmitted to the driving wheels is liable to occur. For example, assuming that the output of the engine and the output of the drive motor are at the same level while the vehicle is running, if the output of the drive motor is interrupted temporarily, the total output transmitted to the driving wheels is undesirably reduced. At this time, the driver is likely to feel a sense of discomfort.

The invention thus provides, among other things, a control unit for a vehicle including a controller that determines whether shifting of a stepped transmission is necessary, and increases output torque of a first drive unit and decreases output torque of a second drive unit in correspondence with an increase of the output torque of the first drive unit, the increase and the decrease being performed prior to shifting of the stepped transmission when a determination is made that shifting is necessary.

The invention also provides, among other things, a method of operating a first drive unit having a first motor and a power distribution apparatus for outputting a driving force from an engine and the first motor to a driving wheel, and a second drive unit having a second motor and a stepped transmission interposed between the second motor and the driving wheel. The method including the steps of determining whether shifting of the stepped transmission is necessary, and increasing output torque of the first drive unit and decreasing output torque of the second drive unit in correspondence with an increase of the output torque of the first drive unit, the increase and the decrease being performed prior to shifting of the stepped transmission when a determination is made that shifting is necessary.

The invention also provides, among other things, a control unit for a vehicle including means for determining whether shifting of a stepped transmission is necessary, and means for increasing output torque of a first drive unit and decreasing output torque of a second drive unit in correspondence with an increase of the output torque of the first drive unit, the increase and the decrease being performed prior to shifting of the stepped transmission when a determination is made that shifting is necessary.

The invention also provides, among other things, a hybrid vehicle including a first drive unit having a first motor and a power distribution apparatus for outputting a driving force from an engine and the first motor to a driving wheel, a second drive unit having a second motor and a stepped transmission interposed between the second motor and the driving wheel, and a controller. The controller determines whether shifting of the stepped transmission is necessary, and increases output torque of the first drive unit and decreases output torque of the second drive unit in correspondence with an increase of the output torque of the first drive unit, the increase and the decrease being performed prior to shifting of the stepped transmission when a determination is made that shifting is necessary.

For the purposes of this disclosure, device and means may be considered synonyms. Further, in some cases, as defined in the specification, the device/means may include other elements.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
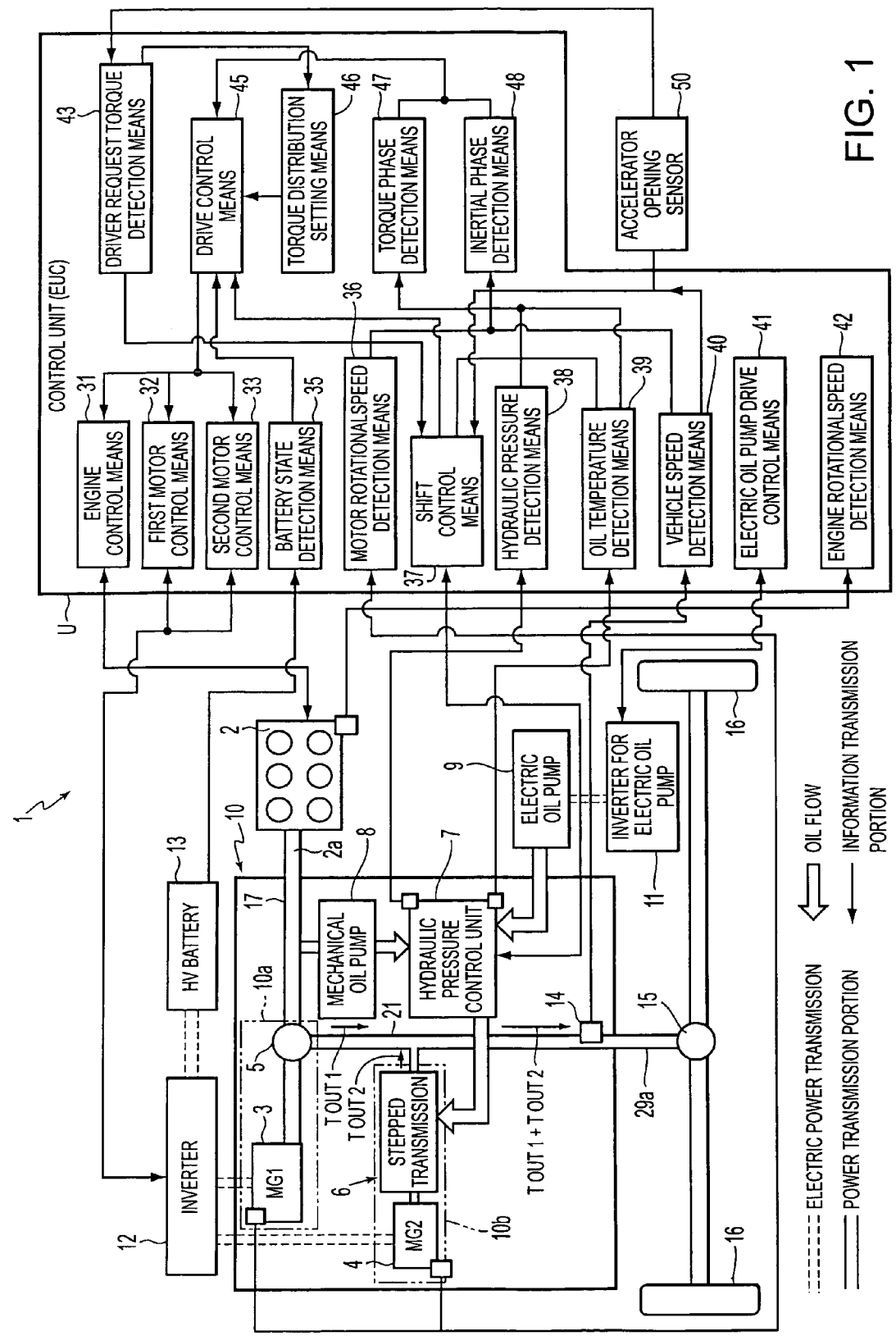
FIG. 1. is a block diagram schematically showing an apparatus for controlling a hybrid vehicle according to the invention.
Figures 2A, 2B:
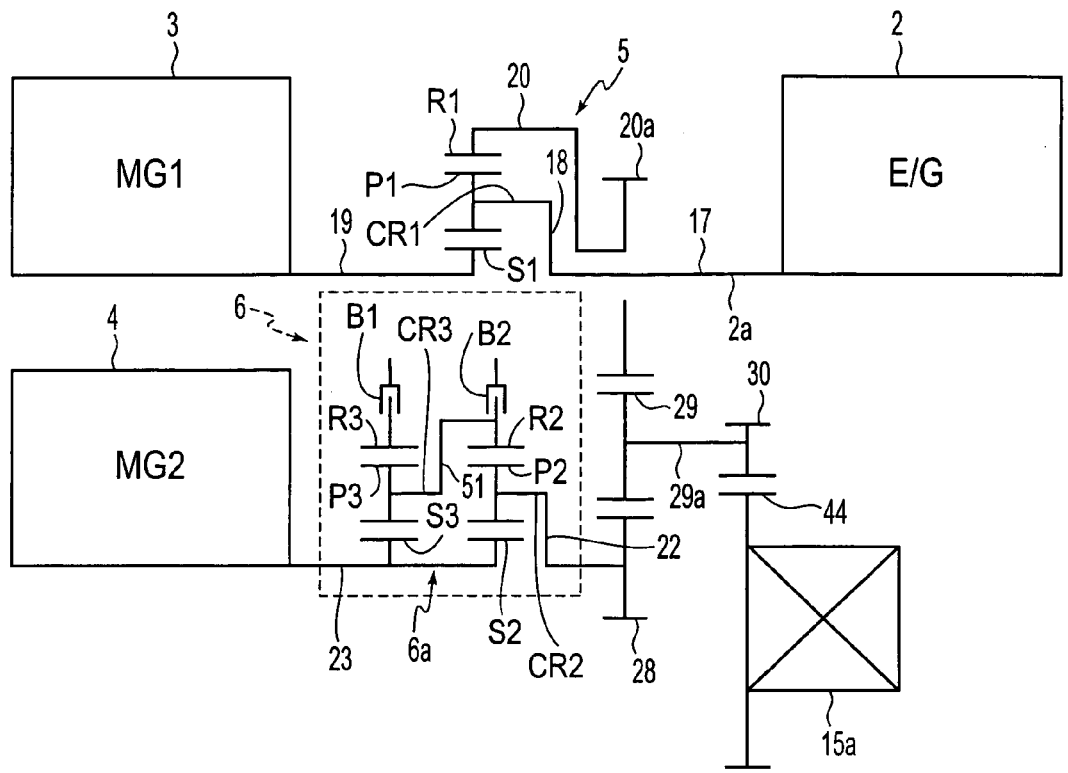
FIGS. 2A and 2B show a drive train of the hybrid vehicle according to the invention, with FIG. 2A being a view schematically showing a cross section of the drive train, and FIG. 2B being an engagement table.
Figure 3:
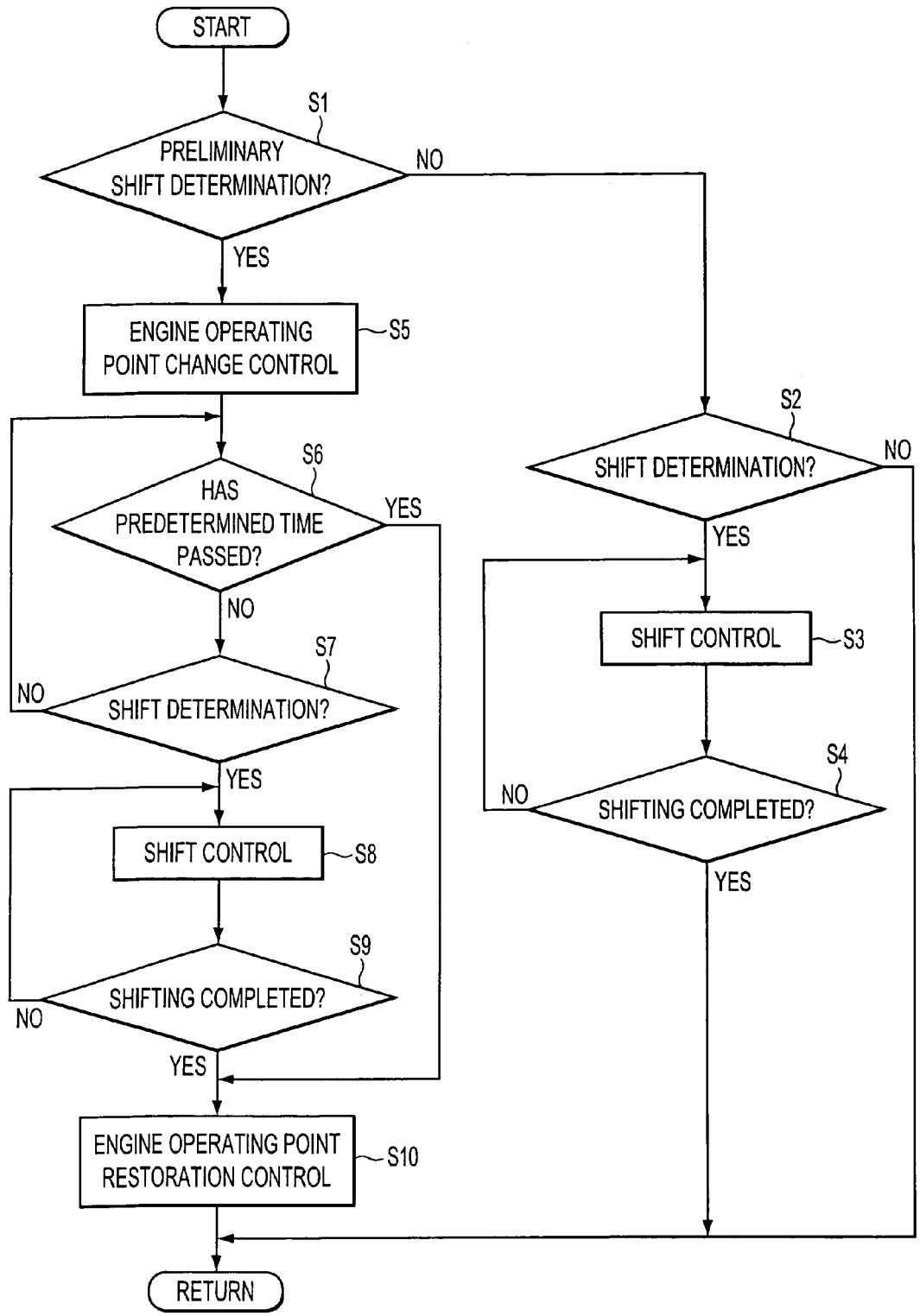
FIG. 3 is a flowchart showing control for changing an engine operating point according to a first embodiment of the invention.
Figure 4:
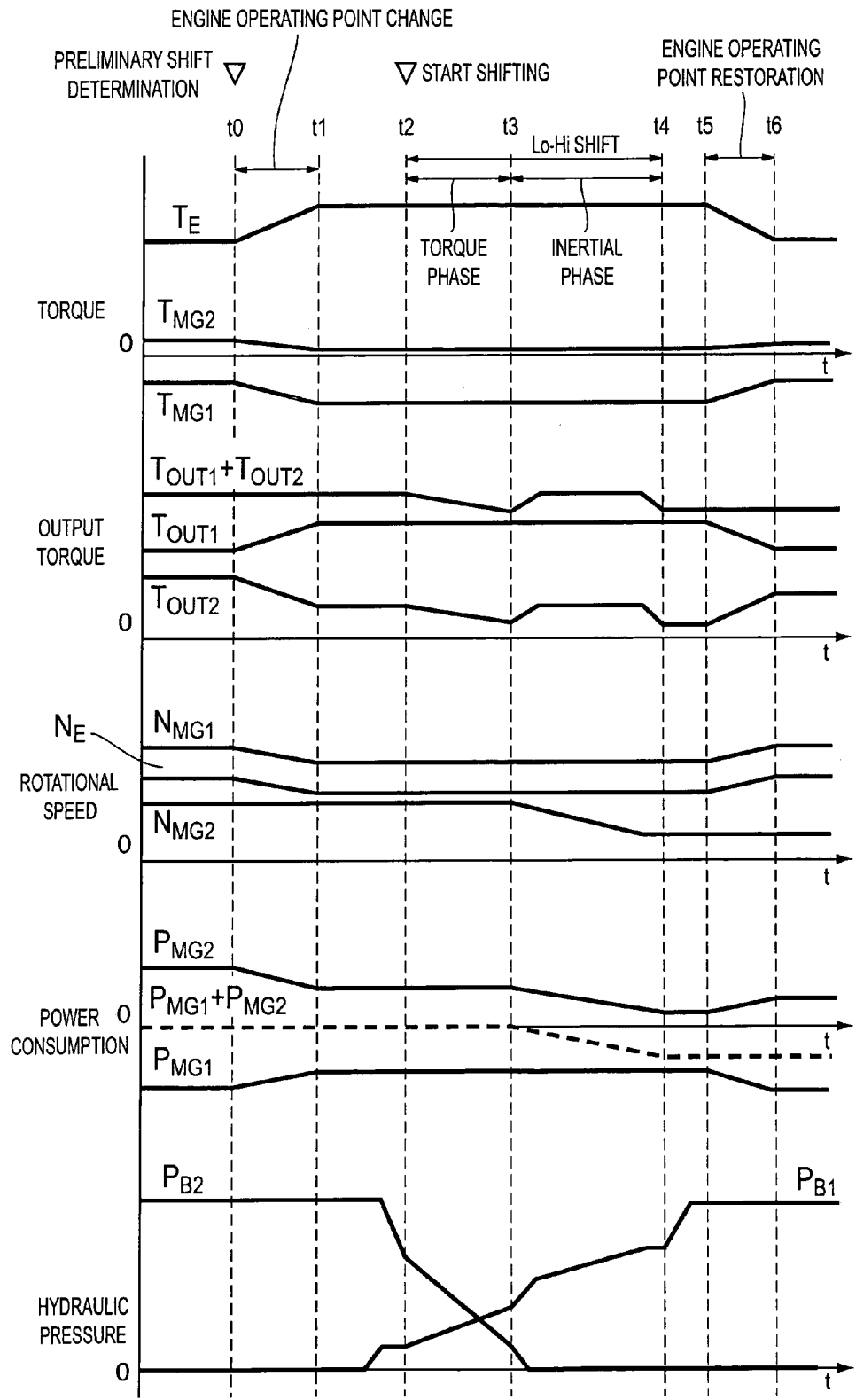
FIG. 4 is a time chart showing the timing of changes in various parameters when control for changing the engine operating point is carried out when up-shifting.
Figure 5:
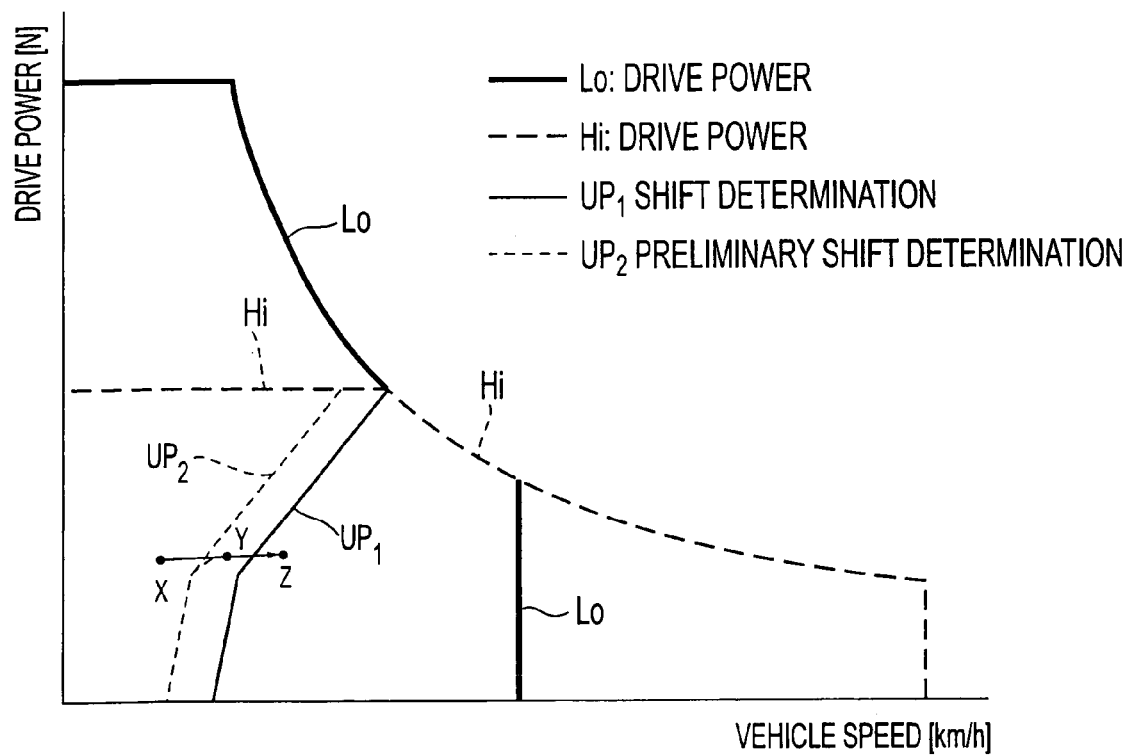
FIG. 5 is a shift map that is used by a shift control means to make a shift determination and a preliminary shift determination.
Figure 6:
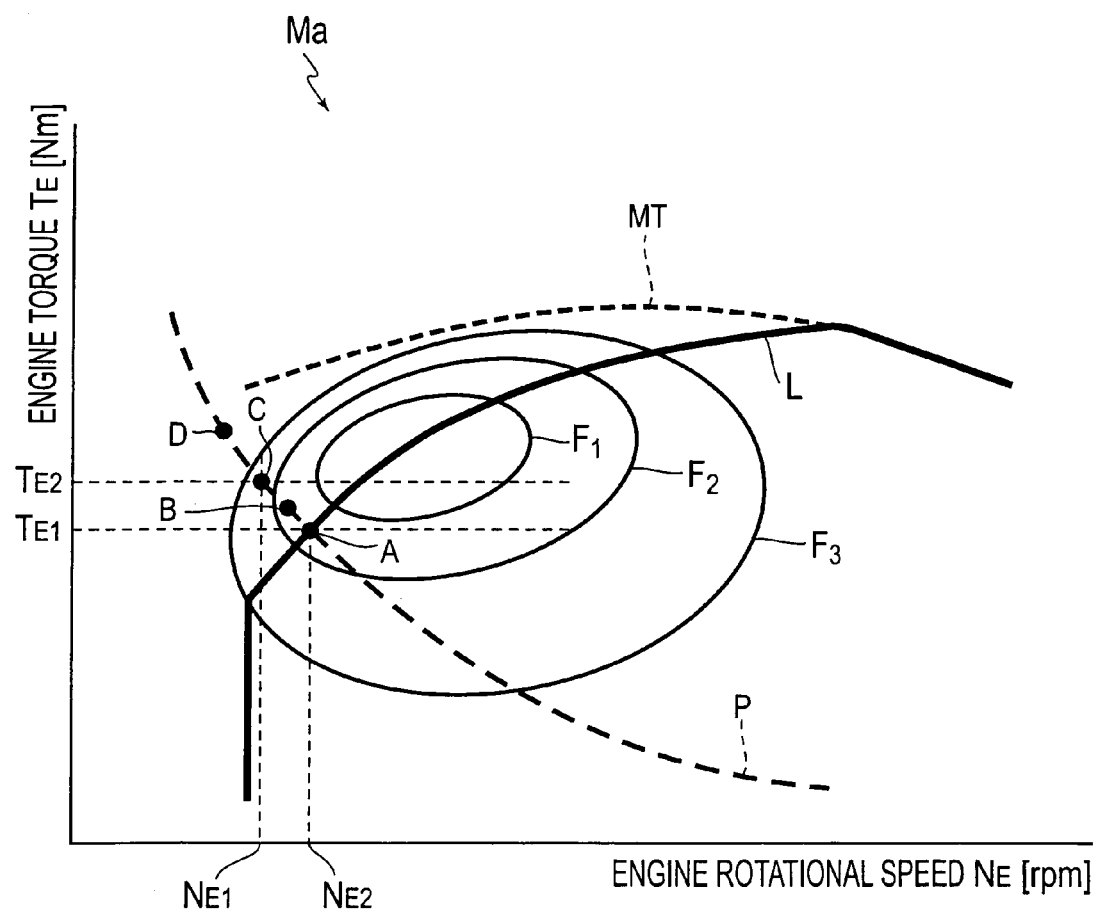
FIG. 6 shows one example of an engine efficiency map.
Figure 7:
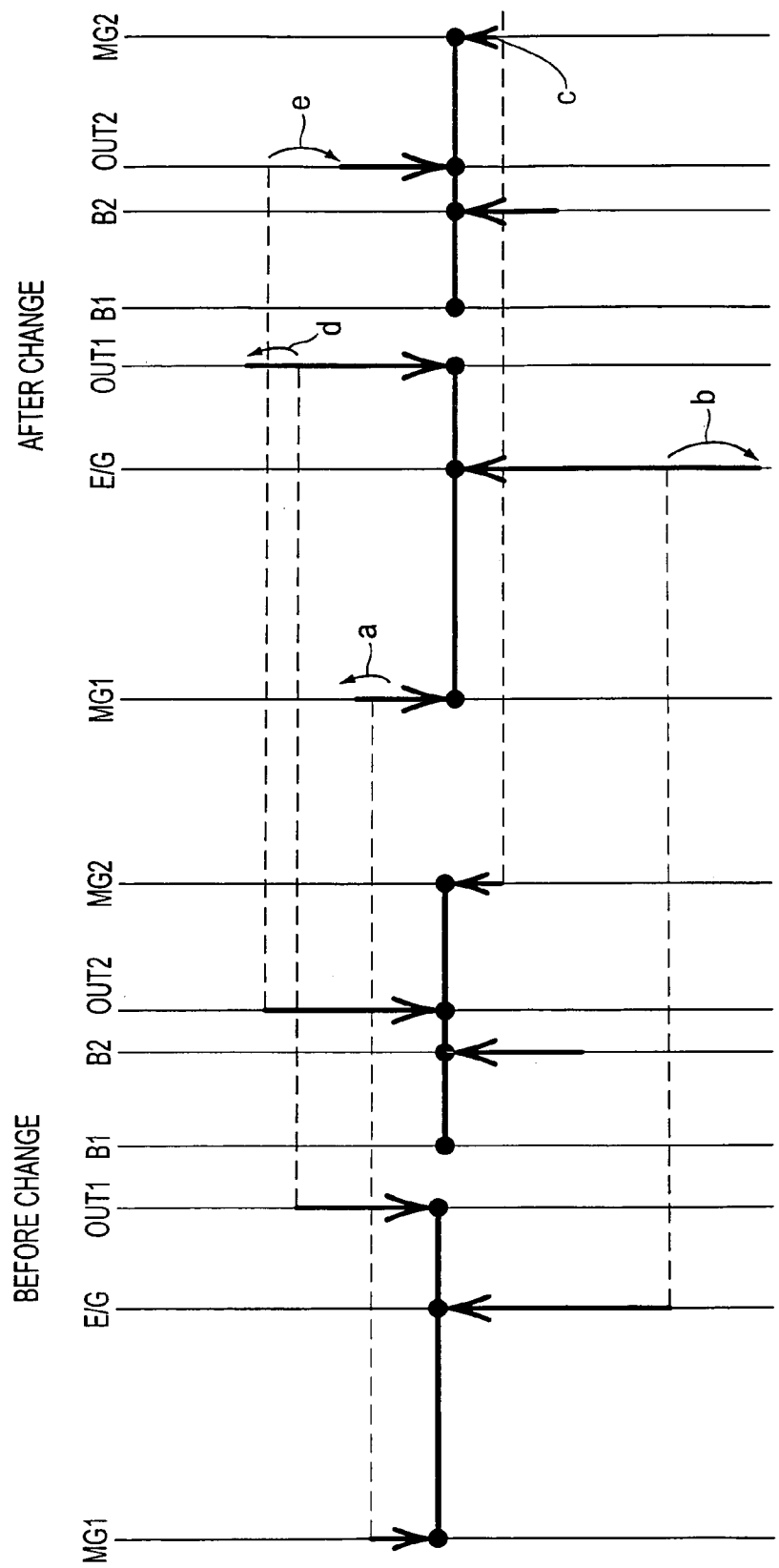
FIG. 7 is a speed diagram showing engine operating points prior to and after changes thereof.

A first embodiment of the invention will be described with reference to FIGS. 1 to 7. FIG. 1 is a block diagram schematically showing an apparatus for controlling a hybrid vehicle according to the invention. FIGS. 2A and 2B show a drive train of the hybrid vehicle according to the invention. FIG. 2A is a view schematically showing the cross section of the drive train, and FIG. 2B is an engagement table. FIG. 3 is a flowchart showing control for changing an engine operating point according to a first embodiment of the invention. FIG. 4 is a time chart showing the timing of changes of various parameters when control for changing the engine operating point is carried out when up-shifting from a low speed stage (Lo) to a high speed stage (Hi). FIG. 5 is a shift map that is used by a shift control means (shift determination means) to make a shift determination and a preliminary shift determination. FIG. 6 shows one example of an engine efficiency map. FIG. 7 is a speed diagram showing engine operating points prior to and after changes thereof.

Firstly, an example of a hybrid vehicle to which the invention has been applied will be described with reference to FIGS. 1 and 2. As shown in FIG. 1, the hybrid vehicle is a two motor split-power type vehicle. The hybrid vehicle includes an internal combustion engine (E/G) 2 that is capable of outputting driving force, a drive unit 10 connected to the engine 2, and a pair of front wheels (driving wheels) 16 connected to the drive unit 10 through a differential 15.

The drive unit 10 includes a first drive unit 10a and a second drive unit 10b for outputting driving force to the front wheels 16. The first drive unit 10a has a first motor 3, and a power distribution planetary gear (power distribution device) 5 for outputting the driving force from the engine 2 and the first motor 3 to the wheels 16. More specifically, in the first drive unit 10a, the power distribution planetary gear 5 is connected to the engine 2 through a damper or the like (not shown), and the first motor (MG1) 3 is connected to the power distribution planetary gear 5. The first drive unit 10a is connected to a power transmission path for transmitting the driving force to the front wheels 16. The second drive unit 10b has a second motor (MG2) 4 and a stepped transmission 6 interposed between the second motor 4 and the power transmission path. Note that, both the first motor 3 and the second motor 4 may be configured as motor generators, for example, as AC synchronous motors.

As shown in FIG. 2A, an input shaft 17 of the drive unit 10 (see FIG. 1) is connected to a crank shaft 2a of the engine 2 through a damper or the like. A carrier CR1 of the power distribution planetary gear 5 (which is a simple planetary gear) is connected to the input shaft 17 through a hub member 18. A pinion P1 is rotatably supported by the carrier CR1. A sun gear S1 is provided inside the pinion P1 such that the sun gear S1 meshes with the pinion P1 at the inside thereof. Further, a ring gear R1 is provided outside the pinion P1 such that the ring gear R1 meshes with the pinion P1 at the outside thereof. A drum shaped support member 20 is connected to the ring gear R1. A transmission gear 20a is integrally provided on the support member 20 on the engine 2 side thereof. The transmission gear 20a is positioned so as to be capable of rotation around the outer periphery of the input shaft 17.

The transmission gear 20a is provided in the power transmission path. Further, an intermediate gear 29 in mesh with the transmission gear 20a, and a transmission gear 28 in mesh with the intermediate gear 29 are provided in the power transmission path. The intermediate gear 29 is coaxially connected to a transmission gear 30 through a shaft 29a. A final ring gear 44 is in mesh with the transmission gear 30. The final ring gear 44 is provided at the external periphery of a differential case 15a of the differential 15 (see FIG. 1).

The stepped transmission 6 is connected to the second motor 4 which is provided in parallel with the first motor 3. The stepped transmission 6 includes a planetary gear unit 6a having a carrier CR2. The carrier CR2 is connected to transmission gear 28 through a hub member 22. The second motor 4 has a rotor shaft 23, and sun gears S2 and S3 are integrally provided at the external periphery of the rotor shaft 23. The sun gear S2 is provided toward the tip end of the rotor shaft 23, and the sun gear S3 is provided at a position further down the rotor shaft 23 toward the second motor 4. A pinion P2 that is rotatably supported by the carrier CR2 is in mesh with the sun gear S2, and a pinion P3 that is rotatably supported by a carrier CR3 is in mesh with the sun gear S3.

A ring gear R3 is provided so as to mesh with the pinion P3 at the outside thereof. A friction plate (multi-plate brake) of a first brake B1 is spline engaged to the external periphery of the ring gear R3. The first brake B1 can be selectively engaged by application of hydraulic pressure to a hydraulic servo (not shown). Further, the ring gear R2 in mesh with the pinion P2 is connected to the carrier CR3 supporting the pinion P3 through a hub 51. A friction plate (multi-plate brake) of a second brake B2 is spline engaged to the external periphery of the ring gear R2. The second brake B2 can be selectively engaged by application of hydraulic pressure to a hydraulic servo (not shown).

As shown in FIG. 1, the input shaft 17 (which is connected to the crank shaft 2a of the engine 2) is connected to the drive unit 10. The drive unit 10 has a mechanical oil pump 8 that is operated in conjunction with the engine 2, and a hydraulic pressure control unit 7. When hydraulic pressure is supplied from the mechanical oil pump 8 to the hydraulic pressure control unit 7, the hydraulic pressure control unit 7 can supplying lubricant oil, coolant oil, and hydraulic pressure for the two hydraulic pressure servo to the stepped transmission 6 and the second motor 4.

The hybrid vehicle has an electric oil pump 9 operated separately (independently) from the mechanical oil pump 8. The electric oil pump 9 is driven by electricity supplied from an inverter 11. The inverter 11 is controlled by electric oil pump control means 41, which will be described later. When the engine 2 is stopped (e.g., during idling stop), the mechanical oil pump 8 operated in conjunction with the engine 2 is also stopped. Therefore, the electric oil pump 9 is mainly used when the mechanical oil pump 8 is stopped so that the hydraulic pressure control unit 7 can maintain hydraulic pressure without the mechanical oil pump 8.

Further, the hybrid vehicle has an inverter 12, and a HV battery (battery for hybrid drive) 13 connected to the inverter 12. The inverter 12 is connected to the first motor 3 and the second motor 4. The inverter 12 is controlled by first motor control means 32 and second motor control means 33, described later, and is capable of (i) regenerating power of the first motor 3 and second motor 4, and (ii) providing power assistance for the first motor 3 and second motor 4. At this time, electric power can be charged to the HV battery 13, or the HV battery 13 can be used as a power supply.

Next, power transmission in the hybrid vehicle will be described with reference to FIGS. 1, 2A and 2B. As shown in FIG. 2A, a torque $T_E$ (hereinafter also referred to as the "engine torque"; (see FIG. 4)) is output from the engine 2 as driving force. The torque $T_E$ is inputted to the carrier CR1 of the power distribution planetary gear 5 through the crank shaft 2a, the input shaft 17 and the hub member 18. On the other hand, by controlling a torque $T_{MG1}$ (see FIG. 4) of the first motor 3 (hereinafter also referred to as the "first motor torque"), part of the engine torque $T_E$ is distributed to the first motor 3, and the torque $T_{MG1}$ of the first motor 3 is transmitted (through the rotor shaft 19 and the sun gear S1) as a reaction force that opposes the engine torque $T_E$. This reaction force causes the ring gear R1 to rotate, and the remaining torque of the engine torque $T_E$ is distributed as a driving force (hereinafter also referred to as the "first drive torque") $T_{OUT1}$. The driving force $T_{OUT1}$ is output from the first driving unit 10a to the transmission gear 20a.

When the stepped transmission 6 receives a signal for shifting from shift control means (shift determination means) 37, described later, hydraulic pressure is supplied from the hydraulic pressure control unit 7 to the hydraulic servo of the first brake B1 or the hydraulic servo of the second brake B2. The resulting engagement of the first brake B1 or second brake B2 enables shifting to be carried out. Specifically, as shown in FIGS. 2A and 2B, when the first brake B1 is engaged, and the second brake B2 is released, rotation of the ring gear R3 is stopped by the first brake B1. Accordingly, in the stepped transmission 6, rotation of the rotor shaft 23 (which is rotating at a rotational speed $N_{MG2}$ (see FIG. 4) of the second motor 4) is transmitted from the carrier CR2 as high speed rotation, and the high speed stage (Hi) is selected.

As shown in FIGS. 2A and 2B, when the second brake B2 is engaged, and the first brake B1 is released, rotation of the ring gear R2 is stopped by the second brake B2, and rotation of the carrier CR3 is stopped by the ring gear R2 through the hub 51. Thus, in the stepped transmission 6, rotation of the rotation shaft 23 (which is rotating at the rotational speed $N_{MG2}$ (see FIG. 4) of the second motor 4) is transmitted from the carrier CR2 as low speed rotation, and the low speed stage (Lo) is selected.

When both the first and second brakes B1, B2 are released, both of the ring gears R2, R3 rotate idly, and rotation at the rotational speed $N_{MG2}$ (see FIG. 4) of the second motor 4 is not transmitted to the transmission gear 28. Accordingly, the stepped transmission 6 is placed in neutral (N).

When a torque (hereinafter also referred to as the "second motor torque") $T_{MG2}$ (see FIG. 4) from the second motor 4 is output, the torque $T_{MG2}$ is transmitted to the sun gears S2, S3 through the rotor shaft 23. At this time, if the low speed stage (Lo) is selected in the stepped transmission 6, the torque $T_{MG2}$ is relatively large, and if the high speed stage (Hi) is selected in the stepped transmission 6, the torque $T_{MG2}$ is relatively small. The torque $T_{MG2}$ is then transmitted to the carrier CR2 and the hub member 22. Thus, a driving force (hereinafter referred to as the "second drive torque") $T_{OUT2}$ output from the second drive unit 10b is transmitted to the front wheels 16.

Then, as shown in FIG. 1, when the first drive torque $T_{OUT1}$ from the first drive unit 10a and the second drive torque $T_{OUT2}$ from the second drive unit 10b are output to the front wheels 16, the total output torque $T_{OUT1}+T_{OUT2}$ is output to the shaft 29a (see FIG. 2A), which acts as an output shaft of the drive unit 10 to the differential 15. Then, the total output torque $T_{OUT1}+T_{OUT2}$ is output to the front wheels 16 through left and right drive axles.

Next, a control apparatus 1 of the hybrid vehicle as a main component of the invention will be described with reference to FIG. 1. The control apparatus 1 of the hybrid vehicle has a control unit (ECU) U. The control unit U includes engine control means 31, first motor control means 32, second motor control means 33, battery state detection means 35, motor rotational speed detection means 36, shift control means 37, hydraulic pressure detection means 38, oil temperature detection means 39, vehicle speed detection means 40, electric oil pump drive control means 41, engine rotational speed detection means 42, driver request torque detection means 43, during shift drive control means 45, torque distribution setting means 46, torque phase detection means 47, and inertial phase detection means 48.

The engine control means 31 is connected to the engine 2. The driving force of the engine 2, i.e., the engine torque $T_E$, can be controlled by changing a throttle opening or a fuel injection amount of the engine 2. The first motor control means 32 is connected to the inverter 12 to control the inverter 12 so as to (i) control power supply from the HV battery 13, and (ii) suitably control driving force of the first motor 3, i.e., the first motor torque $T_{MG1}$. In a similar manner, the second motor control means 33 is connected to the inverter 12 to control the inverter 12 so as to (i) control power supply from the HV battery 13, and (ii) suitably control the driving force of the second motor 4, i.e., the second motor torque $T_{MG2}$.

The battery state detection means 35 is connected to the HV battery 13 for detecting states (voltage and current) of the HV battery 13. Further, based on the detected voltage and current, a state-of-charge (SOC) and various other states of the HV battery 13, such as a state-of-health (SOH) and a temperature of the HV battery 13 are detected. For example, the SOH can be detected based on voltage drop.

Further, the battery state detection means 35 detects the SOC by integrating the current when the vehicle is traveling, for example, in a steady state. The battery state detection means 35 detects the SOC based on I–V characteristics data of the current and the voltage, or the like, at the time of so-called idling stop, when the engine is stopped while waiting at a traffic signal. Moreover, the battery state detection means 35 detects the torque which can be output to the first motor 3 and the second motor 4 based on the SOC and various other states, and the rotational speed detected by the motor rotational speed detection means 36. The motor rotational speed detection means 36 is connected to respective rotational speed sensors (not shown) for detecting respective rotational speeds of the first motor 3 and the second motor 4.

The shift control means 37 is connected to, for example, a linear solenoid valve (not shown) for the first brake B1 and a linear solenoid valve (not shown) for the second brake B2 of the hydraulic pressure control unit 7. The shift control means 37 controls the linear solenoid valves, thereby controlling the hydraulic pressures of the hydraulic servo (not shown) of the first brake B1 and of the hydraulic servo (not shown) of the second brake B2. Accordingly, the shift control means 37 is able to (a) place the stepped transmission 6 in the high speed stage (Hi), the low speed stage (Lo), or neutral (N), and (b) selectively control switch-over between the first brake B1 and the second brake B2.

When a torque requested by a driver is detected by the driver request torque detection means 43, the shift control means 37 determines whether shifting is necessary based on a vehicle speed detected by the vehicle speed detection means 40, and the accelerator opening amount detected by an accelerator opening sensor 50 provided in the vicinity of a driver's seat (not shown). The determination result is transmitted to the during shift drive control means 45. Namely, the shift control means 37 functions as shift determination means for determining whether shifting of the stepped transmission 6 is necessary. It is noted that the driver request torque is determined based on, for example, the vehicle speed and the accelerator opening amount.

The shift control means 37 is operated in a shift determination mode that makes a shift determination for actually performing shifting, and in a preliminary shift determination mode that makes a preliminary shift determination before the shift determination in the shift determination mode. The shift determinations in these modes are carried out according to a shift map shown in FIG. 5. It is assumed that the shift control means 37 uses the accelerator opening amount and the vehicle speed as predetermined conditions for making the shift determinations. If it is determined that the driver is requesting a relatively rapid acceleration based on a rapid change in the accelerator opening amount, shifting needs to be carried out swiftly. Therefore, the shift control means 37 makes a shift determination in the shift determination mode without using the preliminary shift determination mode, and the determination result is output to the during shift drive control means 45. When the change in the accelerator opening amount is relatively slow, and it is determined that the driver is not requesting rapid acceleration, the shift control means 37 makes a preliminary shift determination in the preliminary shift determination mode before the shift determination in the shift determination mode, and the determination result is output to the during shift drive control means 45. For example, if change in the accelerator opening amount is very rapid such as when using kickdown in an automatic transmission (AT) vehicle, the shift control means 37 does not use either of the two shift determination modes, and immediately outputs a command for shift control to the during shift drive control means 45. At this time, if the change in the accelerator opening amount, which is the condition used for determining the driver request torque, is a predetermined threshold value or greater, the during shift drive control means 45 controls the engine control means 31, the first motor control means 32, and the second motor control means 33 in order to inhibit: (a) increase in the output torque from the first drive unit 10a, and (b) decrease in the output torque from the second drive unit 10b. Thus, when it is determined that rapid acceleration is being requested by the driver, rapid shifting is carried out immediately in response to the driver's request.

The shift control means 37 may use various different determination methods for the shift determination. For example, the shift determination may be based on parameters such as the change rate of the accelerator opening amount or the change rate of the driver request torque. If the change rate of the accelerator opening amount or the change rate of the driver request torque is equal to or greater than a respective threshold value, it is determined that acceleration needs to be carried out relatively swiftly. On the other hand, if the change rate of the accelerator opening amount or the change rate of the driver request torque is less than the threshold value, it is determined that acceleration needs to be carried out relatively slowly.

The shift determinations of the shift control means 37 are made based on the relationship between a requested output of the second motor 4 which is determined based on the accelerator opening amount, and the rotational speed $N_{MG2}$ of the second motor 4. For example, if the rotational speed $N_{MG2}$ is increased, the shift control means 37 determines that up-shifting from the low speed stage to the high speed stage needs to be performed; and if the rotational speed $N_{MG2}$ is decreased, the shift control means 37 determines that down-shifting from the high speed to the low speed needs to be performed. Further, if the requested torque of the second motor 4 is increased, the shift control means 37 determines that up-shifting from the low speed to the high speed needs to be performed, and if the requested torque is increased, the shift control means 37 determines that down-shifting from the high speed to the low speed needs to be performed. Next, based on the determination, the shift control means 37 controls shifting of the stepped transmission 6.

The hydraulic pressure detection means 38 is connected to the hydraulic pressure control unit 7, and detects respective hydraulic pressures supplied to the hydraulic servo of the first brake B1 and the hydraulic servo of the second brake B2 by the linear solenoid valve for the first brake B1 and the linear solenoid valve for the second brake B2. Further, the oil temperature detection means 39 detects the oil temperature in the hydraulic pressure control unit 7. Based on the hydraulic pressures detected by the hydraulic pressure detection means 38 and the oil temperature detected by the oil temperature detection means 39, it is possible to detect (calculate) the respective positions of pistons (not shown) of the hydraulic servos of the first and second brakes B1, B2. Thus, the engagement states of the first and second brakes B1, B2 can be detected.

The vehicle speed detection means 40 is connected to a rotational speed sensor 14 which is provided at the output shaft (the shaft 29a) of the drive unit 10 and which is able to detect the vehicle speed based on the rotational speed of the shaft 29a.

The electric oil pump drive control means 41 is connected to the inverter 11. The electric oil pump drive control means 41 controls the inverter 11 so as to control the power supply from a battery (not shown). When the engine rotational speed detection means 42 detects that the engine rotational speed has decreased to a predetermined speed or less, the electric oil pump drive control means 41 drives the electric oil pump 9 in order to supply hydraulic pressure to the hydraulic pressure control unit 7 to maintain the hydraulic pressure at the predetermined pressure or more. In this manner, it is possible to inhibit the hydraulic pressure from decreasing to below the predetermined pressure due to reduction of the hydraulic pressure of the mechanical oil pump 8 operated in conjunction with the engine 2.

The engine rotational speed detection means 42 is connected to, for example, a rotational speed sensor (not shown) which is provided at the crank shaft 2a of the engine 2 and which detects an engine rotational speed $N_E$ of the engine 2.

The driver request torque detection means 43 is connected to the accelerator opening sensor 50 provided in the vicinity of the driver's seat (not shown). The torque (driving force) requested by the driver is detected (calculated) based on the accelerator opening amount and the vehicle speed detected by the vehicle speed detection means 40.

When the during shift drive control means 45 receives notification from the shift control means 37 that it is proceeding to the shift determination mode as a result of the preliminary shift determination, the during shift drive control means 45 systematically controls the engine control means 31, the first motor control means 32, and the second motor control means 33 to (i) increase the first motor torque $T_{MG1}$ (see FIG. 4) output from the first motor 3 and change the operating point of the engine 2 (for example, the engine operating point is changed to A, B, C, or D shown in FIG. 6) as necessary; and (ii) decrease the second motor torque $T_{MG2}$ (see FIG. 4) output from the second motor 4 so that it is possible to minimize fluctuation of the total output torque $T_{OUT1}+T_{OUT2}$ (see FIG. 4) transmitted to the front wheels 16 when the stepped transmission 6 shifts. Then, the during shift drive control means 45 controls the engine control means 31, the first motor control means 32, and the second motor control means 33 so that the total output torque $T_{OUT1}+T_{OUT2}$ of the first and second drive units 10a, 10b is controlled to be substantially equal to the driver request torque. In this manner, the desired output torque requested by the driver can be achieved swiftly while output of the respective torques of the first and second drive units 10a, 10b are appropriately balanced.

When the determination result of the preliminary shift control determination is transmitted from the shift control means 37 to the during shift drive control means 45, the during shift drive control means 45 refers to an engine efficiency map Ma shown in FIG. 6, and selects a suitable point from a plurality of engine operation points (e.g., B to D) to increase the engine torque $T_{E1}$. The engine operation points are defined by combinations of the engine torque $T_E$ [Nm] of the engine output [kW] or the like and the engine rotational speed $N_E$ [rpm]. Note that, the engine torque $T_{E1}$ may be increased by a predetermined fixed value. Further, the engine torque $T_{E1}$ may be increased by x [%] (x>0) of the engine torque $T_{E1}$, or y [%] (y>0) of the output torque of the second motor 4 before shifting.

Further, the during shift drive control means 45 outputs commands to the engine control means 31, the first motor control means 32, and the second motor control means 33 in order to operate the engine 2, the first motor 3 and the second motor 4 in accordance with the selected operating point. Specifically, the during shift drive control means 45 outputs a control command to the engine control means 31 to control the engine 2 so as to output a target engine torque (e.g., $T_{E2}$ in FIG. 6), and outputs a rotational speed control command to the first motor control means 32 to control the first motor 3 such that the engine rotational speed is regulated to a target engine rotational speed (e.g., $N_{E1}$ in FIG. 6). Further, the during shift drive control means 45 outputs a torque control command to the second motor control means 33 for controlling the torque of the second motor 4 based on the driver request torque and the output torque output from the ring gear R1. (Note that, the output torque from the ring gear R1 is output if the first motor torque is used as a reaction force to the engine torque when the first motor 3 is driven according to the rotational speed control). At this time, the command of the during shift drive control means 45 output to the engine control means 31 includes an instruction that states that the rotational speed of the engine 2 is to be increased as slowly as possible so that inertial torque or the like resulting from change in the rotation of the engine 2 can be absorbed by the power distribution planetary gear 5. Thus, the fluctuation of the torque is not transmitted to the shaft 29a.

After a predetermined period of time has passed following performance of the above control, the during shift drive control means 45 performs engine operation point return control to return the engine operating point to the original engine operating point before the change. The during shift drive control means 45 refers to the engine efficiency map Ma shown in FIG. 6, and performs control such that outputs from the first motor 3, the second motor 4, and the engine 2 are returned to the original outputs before shifting, based on the states of the HV battery 13 detected by the battery state detection means 35 such as the amount of electrical power which can be output by the HV battery 13.

Specifically, the during shift drive control means 45 controls the second motor control means 33 to maintain the rotational speed of the second motor 4 at the low rotational speed $N_{MG2}$, and controls the engine control means 31 and the first motor control means 32 to maintain the rotational speeds $N_E$, $N_{MG1}$ of the engine 2 and the first motor 3. Further, the during shift drive control means 45 controls the throttle opening or the fuel injection amount via the engine control means 31 in order to decrease the engine torque $T_E$ to the engine torque prior to the performance of the engine torque control, whereby a return is made to the original engine operating point. At the same time, the during shift drive control means 45 controls the second motor control means 33 to control the second motor such that the second motor torque $T_{MG2}$ becomes substantially equal to the torque before shifting (the torque at a time point t0 in FIG. 4).

The torque distribution setting means 46 determines selection and distribution of torque control during shifting, and before and after shifting. The torque distribution setting means 46 calculates the torque which can be output at the time of torque control during shifting (hereinafter referred to as the "available torque") based on the required amount of the total output torque $T_{OUT1}+T_{OUT2}$ and the electrical power which can be output from the HV battery 13. After calculating the available torque at the time of the torque control during shifting, the torque distribution setting means 46 detects the driver request torque using the driver request torque detection means 43, and determines torque settings based on the driver request torque and the calculated available torque.

The torque phase detection means 47 detects engagement states of the first brake B1 and the second brake B2 based on a command output from the shift control means 37 to the linear solenoid valves of the hydraulic pressure control unit 7; or the hydraulic pressures of the hydraulic pressure servos of the first and second brakes B1, B2, detected by the hydraulic pressure detection means 38; or the oil temperature detected by the oil temperature detection means 39. Then, the torque phase detection means 47 detects a torque phase during shifting in which switch-over of the first brake B1 and the second brake B2 takes place.

The torque phase is a state in which only the torque of the first and second brakes B1, B2 is switched during shifting carried out by a switch over of the first and second brakes B1, B2.

The inertial phase detection means 48 detects the change in the rotational speed of the second motor 4 based on the rotational speed $N_{MG2}$ (see FIG. 4) of the second motor 4 detected by the motor rotational speed detection means 36, and the vehicle speed (namely, the rotational speed of the output shaft 26 or the transmission shaft 21) detected by the vehicle speed detection means 40. As a result, the inertial phase detection means 48 is able to detect an inertial phase during shifting in which switch-over between the first brake B1 and the second brake B2 takes place.

Note that, the inertial phase is a state (during shifting in which switch-over between the first brake B1 and the second brake B2 takes place) where the inertia (inertial force) of the second motor 4 changes due to a change of the rotational speed of the second motor 4 with respect to the output shaft 26 of the drive unit 10 resulting from a change in the gear ratio of the stepped transmission 6. In other words, the inertial phase is a state in which there is a change in the transmission ratio of (i) the rotational speed of the rotor shaft 23 (see FIG. 2) that acts as the input shaft of the stepped transmission 6 and (ii) the rotational speed of hub member 22 (see FIG. 2) that acts as the output shaft of the stepped transmission 6 changes.

Next, an example of a shift control performed by the shift control means 37 and the like during running of the hybrid vehicle having the control apparatus 1 of the invention will be described with reference to a flowchart in FIG. 3, a time chart in FIG. 4, the shift map in FIG. 5, the engine efficiency map in FIG. 6, and a speed diagram in FIG. 7.

The time chart of FIG. 4 shows the timings of changes in various parameters related to various components of the hybrid vehicle that take place when the engine operation point is shifted from A to C, and is then returned back to A. Specifically, FIG. 4 shows, from the top: changes in the torques $T_E$, $T_{MG2}$ and $T_{MG1}$ of the engine 2, the second motor 3, and the first motor 3; changes in the total output torque $T_{OUT1}+T_{OUT2}$, the first torque $T_{OUT1}$ from the first drive unit 10a, and the second drive torque $T_{OUT2}$ from the second drive unit 10b; changes in the rotational speed $N_{MG1}$ of the first motor 3, the rotational speed $N_E$ of the engine 2, and the rotational speed $N_{MG2}$ of the second motor 4; changes in the power consumption $P_{MG2}$ of the second motor 4, the total power consumption $P_{MG1}+P_{MG2}$, and the power consumption $P_{MG1}$ of the first motor 3; and changes in the hydraulic pressure $P_{B1}$ supplied to the first brake B1, and the hydraulic pressure $P_{B2}$ supplied to the second brake B2. Note that, in FIG. 4, it is assumed that the accelerator opening amount is constant, the driver request torque is constant, and the vehicle speed is substantially constant.

In the shift map of FIG. 5, the horizontal axis indicates the vehicle speed [km/h], and the vertical axis indicates the driving force [N], which is the driver request torque. The bold solid line Lo indicates the change in the driving force at low speed, and the broken line Hi indicates the change of the driving force at high speed. The thin solid line UP1 indicates a shift determination, and the thin broken line UP2 indicates a preliminary shift determination. The preliminary shift determination in the preliminary shift determination mode is made using magnitudes of the respective changes of the driver request torque and the vehicle speed (which are the predetermined conditions for the determination) that are relatively small in comparison with the magnitudes of the respective changes of the predetermined conditions in the shift determination of the shift determination mode.

In the engine efficiency map Ma shown in FIG. 6, the horizontal axis indicates the engine rotational speed $N_E$ [rpm], and the vertical axis indicates the engine torque $T_E$ [Nm]. In FIG. 6, point A indicates an engine operation point before the operating point has been changed.

Points B to D are engine operating points after the engine rotational speed has been decreased by a predetermined amount and the engine torque has been increased by a predetermined amount from the engine operating point A. Note that, these engine operating points are not on a best fuel economy curve (which is indicated by the solid line L) but are still within its vicinity. When the engine operating point shifts from the point A, the engine rotational speed is decreased from $N_{E2}$ to $N_{E1}$, and the engine torque is increased from $T_{E1}$ to $T_{E2}$.

In FIG. 6, the curve indicated by a broken line MT is the maximum torque, the curve indicated by the solid line L is the best fuel economy curve, and the curve indicated by a broken line P is the power of the engine or the like. Further, the closed loops indicated by $F_1$ to $F_3$ are lines showing level fuel consumption. These lines $F_1$ to $F_3$ are established by connecting up points having the same rate of fuel consumption (for example, the number of grams of fuel that are consumed per one horse power for one hour g/ps·h) to form contoured lines. If the number of the closed loop (for example, $F_1$, $F_2$, $F_3$) is small, this indicates that the fuel consumption rate is low, i.e., the fuel economy is good.

The best fuel economy curve L is determined by engine characteristics. Specifically, the best fuel economy curve L is a line which is determined beforehand by setting the relationship between the engine rotational speed $N_E$ and the engine torque $T_E$ such that (a) the engine torque $T_E$ smoothly output from the engine 2 changes in accordance with change in the engine rotational speed $N_E$ (i.e., the change in the vehicle speed); and (b) the engine 2 is operated in the best fuel economy state. Accordingly, the engine 2 is capable of outputting the engine torque $T_E$ in the most efficient state at a certain point of time. The engine torque $T_E$ can be changed freely by controlling the throttle opening of the engine 2 using the electric throttle control.

In FIG. 4, until, at the least, the time point t0, the hydraulic pressure $P_{B2}$ is applied to the hydraulic pressure servo such that the second brake B2 is engaged. Accordingly, the low speed stage (Lo) is selected by the stepped transmission 6. At this time, the second motor 4 is rotated at the rotational speed $N_{MG2}$ corresponding to the gear ratio of the stepped transmission 6 and the vehicle speed, and the second motor torque $T_{MG2}$ is output in response to the driver request torque detected by the driver request torque detection means 43. The engine 2 and the first motor 3 rotate at rotational speeds $N_E$ and $N_{MG1}$, which are higher than the rotational speed $N_{MG2}$ of the second motor 4. The engine torque $T_E$ corresponding to reaction force resulting from the output of the first motor 3 is output from the power distribution planetary gear 5.

While the vehicle is running in the above state, for example, at the time point t0, the shift control means 37 makes a preliminary shift determination (step S1 of FIG. 3) in the preliminary shift determination mode (based on the shift map shown in FIG. 5). Specifically, the shift control means 37 refers to the shift map in FIG. 5, and makes a preliminary shift determination that up-shifting is required when the vehicle speed [km/h] and the driving force (driver request torque) [N] change from X to Y as shown in FIG. 5, based on the accelerator opening amount (the driver request torque), the running stage of the vehicle, and the like.

When it is determined that shifting should not be started by the preliminary shift determination in step S1, the shift determination is made, in step S2, in the same manner as described later for step S7. If it is determined that shifting should not be started by the shifting determination in step S2, the process is finished (returns). If it is determined that shifting should be started, the process proceeds to step S3 where shift control is performed in the same manner as the shift control in step S8, described later. Then, it is determined whether shifting should be completed in step S4. If it is determined that the shifting should be completed, the process is finished (returns). If it is determined that shifting should not be completed, the shift control of step S3 is repeated.

On the other hand, if it is determined that shifting should be started by the preliminary shift determination in step S1, the shift control means 37 refers to the engine efficiency map Ma shown in FIG. 6. The engine operating point at the time of making the preliminary shift determination is, for example, the engine operating point A. A new engine operating point, namely, the engine operating point C, which is to be shifted to from the engine operating point A, is selected. Then, this determination result is transmitted to the during shift drive control means 45. In response to the received determination result, the during shift drive control means 45 controls the engine control means 31, the first motor control means 32, and the second motor control means 33 in order to change the engine operating point from A to C (step S5).

The during shift drive control means 45 outputs commands to the engine control means 31, the first motor control means 32, and the second motor control means 33 to operate the engine 2, the first motor 3, and the second motor 4 so as to shift the engine operating point from A to C. From the time point t0 to the time point t1 shown in FIG. 4, the during shift drive control means 45 controls the first control means to (i) decrease the rotational speed $N_{MG1}$ of the first motor 3 by a predetermined amount and (ii) increase the absolute value of the first motor torque $T_{MG1}$ in a predetermined direction so as to increase the reaction force. Further, the during shift drive control means 45 shifts the engine operating point from A to C by using the engine control means 31 to increase the engine torque $T_E$ by a predetermined amount by controlling the throttle opening of the engine 2 using electric throttle control. At the same time, the during shift drive control means 45 controls the second motor control means 33 to maintain the rotational speed $N_{MG2}$ of the second motor 4 and decrease the second motor torque $T_{MG2}$ by a predetermined amount. Thus, the engine operating point is shifted from A to C. At this time, the engine torque $T_E$ is increased from the time point t0 to t1 in FIG. 4 (i.e., from $T_{E1}$ to $T_{E2}$ in FIG. 6).

The shift control means 37 determines whether a predetermined period has passed from the time point t1 in step S6. As a result, if it is determined that a predetermined period has passed, the processing proceeds to step S10 in order to perform the engine operating point restoration control, described later. If it is determined that the predetermined period has not yet passed, the shift control means 37 makes a shift determination based on the shift map shown in FIG. 6 in order to determine whether shifting (up-shifting in this case) should be performed at the time point when the driver request torque moves from the above-described line $UP_2$ to the line $UP_1$ (for example, a movement from Y to Z in FIG. 5) in step S7.

If it is determined that shifting should be started in the above shift determination, the shift control is started from the time point t2 (step S8). This shift control will be described below, starting with the change in the hydraulic pressure. Specifically, prior to reaching the time point t2, the shift control means 37 controls the linear solenoid valve (not shown) of the hydraulic pressure control unit 7 to start increasing the hydraulic pressure $P_{B1}$ of the hydraulic servo of the first brake B1. Thus, the friction plate (not shown) of the first brake B1 and the piston of the hydraulic servo move close to each other. Consequently, so-called "play reduction" is carried out. Shortly before the time point t2, the shift control means 37 controls the hydraulic pressure control unit 7 so as to decrease the hydraulic pressure $P_{B2}$ of the hydraulic servo of the second brake B2 in order to reduce the pressure that the piston of the hydraulic servo of the second brake B2 applies to the friction plate.

At the time point t2, the shift control means 37 slowly decreases the hydraulic pressure $P_{B2}$ of the hydraulic servo of the second brake B2, and slowly increases the hydraulic pressure $P_{B1}$ of the hydraulic servo of the first brake B1. Thus, the friction plate of the second brake B2 slips, whereby the transmission torque of the second brake B2 decreases. Further, the friction plate of the first brake B1 slips, whereby the transmission torque of the first brake B1 increases. Thus, the transmission torque of the first brake B1 replaces the transmission torque of the second brake B2, and the torque phase is entered. In the torque phase, both the first brake B1 and the second brake B2 slip, and the transmission torque of the stepped transmission 6 is decreased. As a result, the second drive torque $T_{OUT2}$ from the second drive unit 10b, which has been decreased due to a decrease in the second motor torque $T_{MG2}$ from the time point t0, is decreased still further due to the second motor torque $T_{MG2}$.

Then, the torque of the first brake B1 replaces the torque of the second brake B2. At the time point t3, when the transmission torque of the second brake B2 has been decreased to substantially zero, torque is only transmitted by the first brake B1. The shift control means 37 then further increases the hydraulic pressure $P_{B1}$ of the hydraulic servo of the first brake B1. Thus, the first brake B1 gradually moves from the slipping state until it is engaged, and the gear ratio of the stepped transmission 6 changes from the low speed stage (Lo) to the high speed stage (Hi). Accordingly, the rotational speed $N_{MG2}$ of the second motor 4 is decreased, and the inertial phase entered. The inertial phase detection means 48 detects the inertial phase based on the change in the vehicle speed and the rotational speed $N_{MG2}$ of the second motor 4. After the time point t3, the hydraulic pressure $P_{B2}$ of the hydraulic servo of the second brake B2 is bled such that the hydraulic pressure $P_{B2}$ becomes substantially zero.

From the time point t3 to the time point t4, the above control is repeatedly carried out, and, the rotational speed $N_{MG2}$ of the second motor 4 is decreased. At the time point t4, the first brake B1 is substantially fully engaged, and the second torque $T_{OUT2}$ from the second drive unit 10b reaches a minimum. In the inertial phase, the rotational speed $N_{MG2}$ of the second motor 4 with respect to the shaft 29a (i.e., the front wheels 16) changes. Therefore, an inertial force is generated in the stepped transmission 6 corresponding to the magnitude of the change of the rotational speed $N_{MG2}$. The torque for the inertia force (hereinafter referred to as the "inertia torque") is output from the second drive unit 10b. Therefore, the second drive torque $T_{OUT2}$ of the second drive unit 10b is increased temporarily between the time points t3 and t4 in FIG. 4 by the inertia torque, and then, decreased gradually as the rotational speed $N_{MG2}$ converges on the high speed stage.

Subsequently, from the time point t4 to t5, the shift control means 37 increases the hydraulic pressure $P_{B1}$ of the hydraulic servo of the first brake B1 until the first brake B1 is fully engaged. Then, in step S9 of FIG. 3, the shift control means 37 determines whether shifting has been completed. If it is determined that shifting has not yet been completed, the shift control in step S8 is repeatedly carried out. The shift control means 37 finishes the shift control at the time point t5 when it is determined that shifting has been completed in step S9, and the process proceeds to step S10 in order to perform the engine operating point restoration control.

Specifically, in the engine operating point control from the time point t5 to t6, the during shift drive control means 45 controls the second motor control means 33 to maintain the low rotational speed $N_{MG2}$ of the second motor 4, and controls the engine control means 31 and the first motor control means 32 to gradually restore the rotational speeds $N_E$ and $N_{MG1}$ of the engine 2 and the first motor 3. The rotational speeds $N_E$ and $N_{MG1}$ of the engine 2 and the first motor 3 are decreased at the time point t1, and maintained at low levels until the time point t5. After that, the rotational speeds $N_E$, $N_{MG1}$ of the engine 2 and the first motor 3 are restored gradually to the original levels. The during shift drive control means 45 controls the engine control means 31 to decrease the engine torque $T_E$ to its level before the engine torque control, thus restoring the engine operating point from C to A. At the same time, the during shift drive control means 45 controls the second motor control means 33 to change the second motor torque $T_{MG2}$ back to substantially the same level as the time point t0 before shifting.

Note that, in the above control, from the time point t0 to t6, the electrical energy $P_{MG2}$ consumed by the second motor 4 is decreased, and the electrical energy $P_{MG1}$ consumed by the first motor 3 is not substantially changed. Therefore, the total energy consumption $P_{MG1}+P_{MG2}$ is decreased from the time point t3.

The change in the torque can also be appreciated from the speed diagram shown in FIG. 7. Specifically, in order to change the engine operating point before the shift control is performed, the first motor torque $T_{MG1}$ and the engine torque $T_E$ are increased (increased by amounts a and b in FIG. 7), and the second motor torque $T_{MG2}$ is decreased (deceased by amount c in FIG. 7) such that the torque change is offset by the increase of the first drive torque $T_{OUT1}$ (see d shown in FIG. 7) and the decrease of the second torque $T_{OUT2}$ of the second drive torque (see e shown in FIG. 7). Thus, there is substantially no effect in terms of torque change in the stepped transmission 6 at the time of shifting from the low speed stage to the high speed stage. Consequently, the change in the total output torque $T_{OUT1}+T_{OUT2}$ of the first drive torque and the second output torque before and after shifting is relatively small. Therefore, the torque state at the time of shifting is very balanced.

In the embodiment of the invention, only up-shifting (from the low speed stage to the high speed stage) is described. Down-shifting (from the high speed stage to the low speed stage) is different in that the torque phase and the inertial phase shown in FIG. 4 occur in reverse order, and, in overall terms, the change of state occurs in substantially the opposite manner to up-shifting.

As described above, in the control apparatus 1 for the hybrid vehicle according to the embodiment of the invention, if it is determined that shifting is necessary, the engine control means 31, the first motor control means 32, and the second motor control means 33 and the during shift drive control means 45 (which act as the output control means), decrease the second motor torque $T_{OUT2}$ which affects the total output transmitted through the stepped transmission 6 to the front wheels 16. Thus, according to the control apparatus 1, shifting of the stepped transmission 6 is performed such that the second motor torque $T_{OUT2}$ is decreased when the torque of the first drive unit 10a is increased. Accordingly, the fluctuation of the output caused by the switch-over of the friction engagement members at the time of shifting is minimized. Consequently, the driver is not caused to feel a sense of discomfort. Further, the torque increase of the first drive unit 10a fully compensates for the decrease of the second motor torque $T_{MG2}$ to keep the total output transmitted to the front wheels 16 at a substantially constant level at the time of shifting. Since the friction between the friction engagement members is reduced by the decrease of the torque transmitted through the stepped transmission 6, the amount of heat generated at the time of shifting is reduced.

Further, the engine control means 31, the first motor control means 32, the second motor control means 33, and the during shift drive control means 45 not only (i) increase the reaction force ($T_{MG1}$) that opposes the engine torque $T_E$ by increasing the output of the first motor 3 so as to increase the first drive torque $T_{OUT1}$ of the first drive unit 10a, but also (ii) increase the engine torque $T_E$ by increasing the first motor torque $T_{MG1}$ and changing the engine operation point. Therefore, the output torque $T_{OUT1}$ of the first drive unit 10a is increased in a comparatively stable manner.

In the embodiment of the invention, the during shift drive control means 45 selects the operating point of the engine 2 in the engine efficiency map Ma, and controls the engine control means 31, the first motor control means 32, and the second motor control means 33 such that the engine operating point is shifted to the selected operation, for example, the operating point C. The engine rotational speed $N_E$ and the engine torque $T_E$ are suitably regulated, for example, the engine rotational speed $N_E$ is decreased and the engine torque $T_E$ is increased such that shifting can be carried out, in comparative terms, in the vicinity of the best fuel economy curve L of the engine efficiency map Ma.

Further, after shifting is completed, the during shift drive control means 45 controls the engine control means 31, the first motor control means 32, and the second motor control means 33 such that the outputs of the first motor 3, the second motor 4, and the engine 2 are restored to the original levels before shifting. Therefore, the engine torque $T_E$ and the second motor torque $T_{MG2}$, which are controlled to have a different balance during shifting, are swiftly restored to the original states before shifting. The large engine torque $T_E$ is decreased to minimize fuel consumption, and thus, fuel economy is good.

According to the embodiment of the invention, the shift control means 37 is operated in the shift determination mode for making a shift determination for actual shifting, and in the preliminary shift determination mode for making a preliminary shift determination before the actual shifting. Consider an example in which it is assumed that the shift control means 37 uses the accelerator opening amount and the vehicle speed as predetermined states for making the shift determinations. If the accelerator opening amount changes rapidly, and it is determined that the driver is requesting rapid acceleration, the shift control means 37 immediately makes a shift determination in the shift determination mode for actual shifting so as to quickly perform shifting in response to the driver's urgent request. If the accelerator opening amount changes slowly, and it is determined that the driver is not requesting rapid acceleration, the shift control means makes a preliminary shift determination in the preliminary shift determination mode, and then, makes a shift determination in the shift determination mode for actual shifting so as to stably perform shifting in response to the driver's request.

Figure 8:
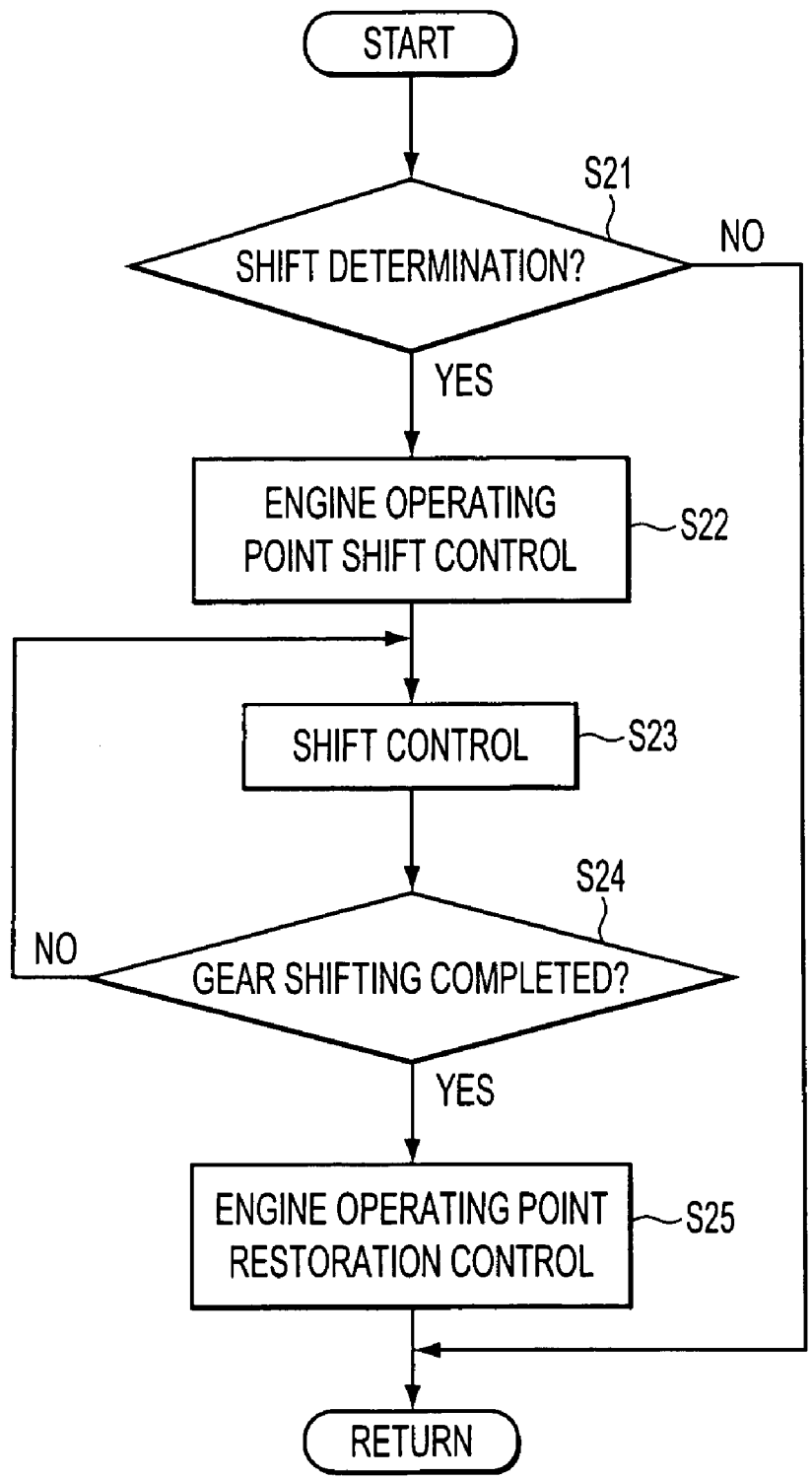
FIG. 8 is a flowchart showing control according to a second embodiment of the invention.

Next, a second embodiment of the invention will be described. FIG. 8 is a flowchart showing control according to the second embodiment of the invention. The second embodiment only differs from the first embodiment in that the shift control means 37 makes the shift determination without making any preliminary shift determination. The remaining control in the second embodiment is substantially the same as that of the first embodiment. Thus, the second embodiment will also be described with reference to FIGS. 1, 2, and 5 to 7.

When the stepped transmission 6 is in, for example, the low speed, the second motor 4 rotates at the rotational speed $N_{MG2}$ in accordance with the gear ratio of the stepped transmission 6 and the vehicle speed, and outputs the second motor torque $T_{MG2}$ in response to the driver request torque. The engine 2 and the motor 3 rotate at the rotational speeds $N_E$ and $N_{MG1}$, which are higher than the rotational speed $N_{MG2}$ of the second motor 4. The engine torque $T_E$ corresponding to the reaction force generated by the first motor 3 is output from the power distribution planetary gear 5.

While the vehicle is running in the above state, the shift control means 37 refers to the shift map shown in FIG. 5. When the vehicle speed [km/h] and the driving force [N] are changed to exceed the line $UP_1$ shown in FIG. 5, the shift control means 37 determines that up-shifting should be started (step S21). If it is determines that shifting should not be started, the process is finished (returns).

If it is determined that shifting should be started in step S21, the shift control means 37 refers to the engine efficiency map Ma shown in FIG. 6, and selects the engine operating point to be shifted to from the engine operating point at the time of shift determination. For example, the engine operating point may be shifted from A to C. The determination result is transmitted to the during shift drive control means 45. The during shift drive control means 45 controls the engine control means 31, the first motor control means 32, and the second motor control means 33 in order to shift the engine operating point from A to C in step S22. Specifically, the during shift drive control means 45 sends commands to the engine control means 31, the first motor control means 32, and the second motor control means 33 to operate the engine 2, the first motor 3, and the second motor 4 in order to change the engine operating point from A to C.

In step S23, the shift control is performed in the same manner as that of step S8 of FIG. 3. Then, in step S24, it is determined whether shifting has been completed. If shifting has not yet been completed, the shift control in step S23 is repeated. If it is determined that shifting has been completed, the shift control is ended, and in step S25, the engine operating point restoration control is performed in the same manner as that of step S10 in FIG. 3.

Specifically, in the engine operating point restoration control, the during shift drive control means 45 maintains the low rotational speed $N_{MG2}$ of the second motor 4, and gradually restores the rotational speeds $N_E$ and $N_{MG1}$ of the engine 2 and the first motor 3. The rotational speeds $N_E$ and $N_{MG1}$ of the engine 2 and the first motor 3 are decreased at the time point t1, and maintained at low levels until the time point t5. After that, the rotational speeds $N_E$ and $N_{MG1}$ of the engine 2 and the first motor 3 are restored gradually to the original levels. Further, the during shift drive control means 45 decreases the engine torque $T_E$ to the torque at the time point t0 shown in FIG. 4, and controls the second motor torque $T_{MG2}$ so that it becomes substantially equal to the torque at the time point t0 in FIG. 4. In this manner, the engine operating point C is restored to the engine operating point A.

According to the second embodiment of the invention, the preliminary shift determination of the first embodiment is not used. Only the shift determination is made based on the predetermined conditions, i.e., the changes in the respective magnitudes of the accelerator opening amount and the vehicle speed. The changes in the magnitudes of the accelerator opening amount and the vehicle speed that are used as the predetermined conditions for making the shift determination are set to be slightly higher than the equivalent predetermined conditions for making the preliminary shift determination. With the second embodiment, substantially the same advantages as those of the first embodiment can be obtained.

Note that, only the stepped transmission 6 having the first and second brakes B1, B2 for performing shifting between the two speed stages (namely, the low speed stage and the high speed stage) has been described in the embodiments of the invention. However, it will be clearly apparent that the invention may be applied to any kind of multiple speed transmission such as a three-speed transmission or a four-speed transmission.

With the configurations according to the embodiments of the invention, for example, the functions of the engine 2 and the first motor 3 may be switched (replaced with each other) such that the output torque $T_{MG1}$ from the first motor 3 is distributed to the engine 2 and the front wheels 16. In this case, various means for controlling other components are basically the same as those described above. However, instead of the output control means (31, 32, 33, 45) performing control so as to increase the reaction force of the engine torque $T_E$ as described in the above first and second embodiments, the output torque $T_E$ of the engine 2 is increased (in this case, the engine torque $T_E$ is less than the first motor torque $T_{MG1}$).

Figure 9:
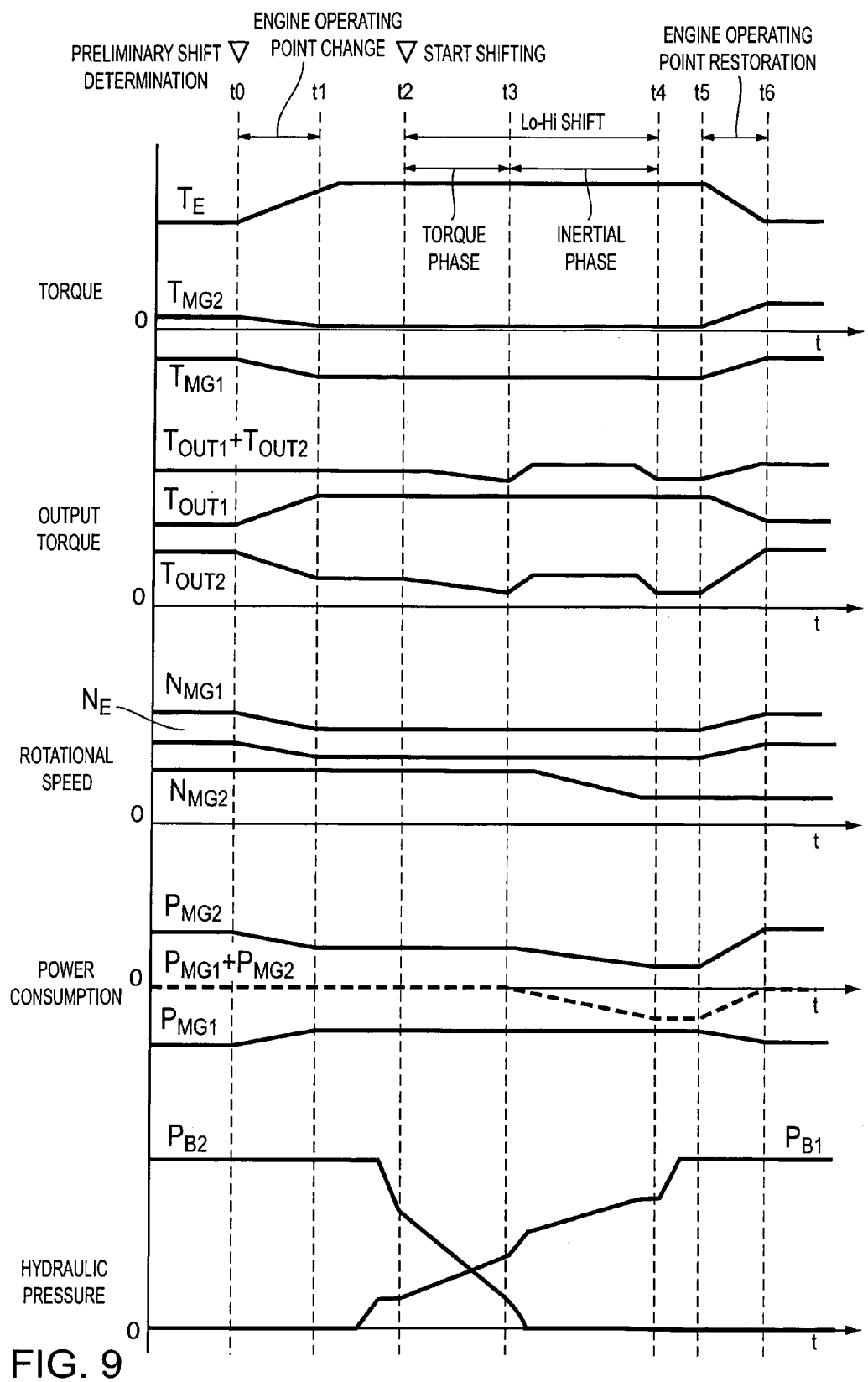
FIG. 9 is a time chart of a modified example in which changes in the parameters are slightly different to those shown in FIG. 4 after a time point t5.

FIG. 9 is a time chart showing a modified example in which changes in the parameters are slightly different to those of the first embodiment, as shown in FIG. 4, after a time point t5. Specifically, in the first embodiment, after the time point t5 when shifting is completed, the second motor torque $T_{MG2}$ is simply restored to the torque before shifting (i.e., the torque at the time point t0). Therefore, as shown in FIG. 4, the total output torque $T_{OUT1}+T_{OUT2}$ is actually decreased by the amount of the torque down during shifting to the high speed stage. In the modified embodiment, however, the second motor torque $T_{MG2}$ is increased in contrast to the case in FIG. 4 by an amount corresponding to the torque down. Therefore, the total output torque $T_{OUT1}+T_{OUT2}$ is restored to a torque which is substantially the same as the torque before shift control, i.e., the torque at the time point t0.

By using this control, in addition to the advantage of the first embodiment (namely, that it is possible to reduce the torque down resulting from shifting in which the brakes B1, B2 of the stepped transmission 6 are switched over), it is possible to reliably inhibit torque fluctuation before and after shifting. Therefore, it is possible to ensure, to an even greater extent, that the driver does not feel any discomfort at the time of shifting.

Figure 10:
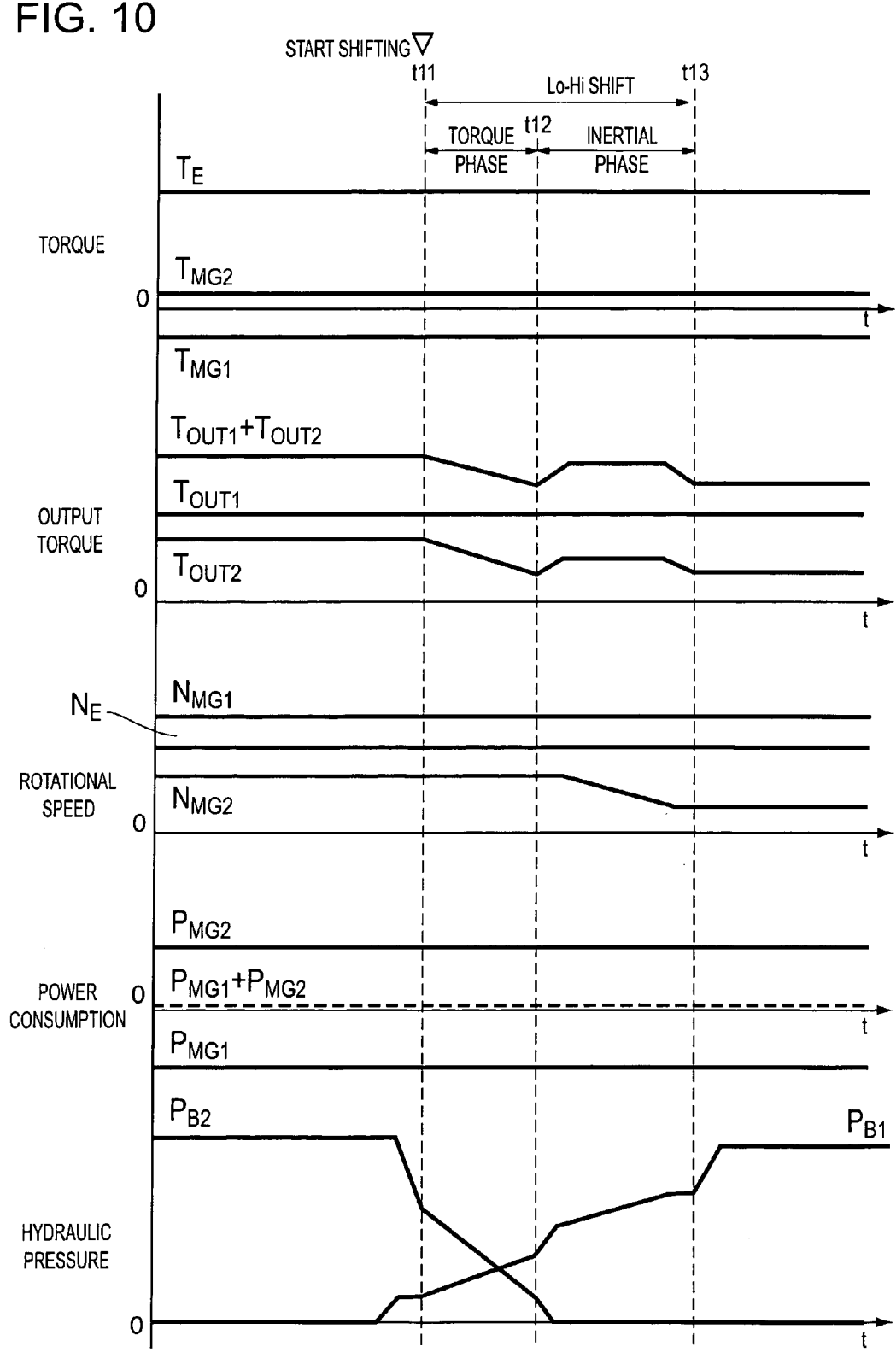
FIG. 10 is a time chart showing control in a comparative example.

Next, an example for comparison with the above-described embodiments will be described with reference to FIG. 10. FIG. 10 is a time chart showing control in the comparative example. Specifically, when the second brake B2 is engaged to switch the stepped transmission 6 into the low speed stage, the second motor 4 rotates at a rotational speed $N_{MG2}$ in accordance with the gear ratio of the stepped transmission 6 and the vehicle speed. The second motor torque $T_{MG2}$ is output in correspondence with the driver request torque. Further, the engine 2 and the first motor 3 rotate at rotational speeds $N_E$, $N_{MG1}$, which are higher than the rotational speed $N_{MG2}$ of the second motor 4. The engine torque $T_E$, which corresponds to a reaction force resulting the output of the first motor 3, is output from the power distribution planetary gear 5.

According to the comparative example, shift control is carried out in the above state. However, the engine operating point is not changed as in the first and second embodiments. Therefore, the engine torque $T_E$, the first motor torque $T_{MG1}$, and the second motor torque $T_{MG2}$ are not changed when shifting of the stepped transmission 6 takes place. From the start of shifting at the time t11, through the torque phase, the time point t2, and the inertial phase, to the end of shifting at the time point t13, the second drive torque $T_{OUT2}$ from the second drive unit 10b drops reduces significantly from the time point t11 to the time point t12 since the second motor torque $T_{MG2}$ is not reduced. Then, the second drive torque $T_{OUT2}$ increases significantly in the inertial phase. Therefore, the torque fluctuation is reflected in the total output torque $T_{OUT1}+T_{OUT2}$. Thus, the driver is caused to feel discomfort during shifting, and after shifting.

According to a first exemplary aspect of the invention, fluctuations of the output due to a switch-over of friction engagement members at the time of shifting is minimized. Consequently, a driver of the hybrid vehicle is not caused discomfort. The torque increase of the first drive unit fully compensates for a decrease of the second motor torque to keep the total output transmitted to the driving wheel at a substantially constant level at the time of shifting. Since friction between the friction engagement members is reduced by the decrease of the torque transmitted through the stepped transmission, the amount of heat generated at the time of shifting is reduced.

According to a second exemplary aspect of the invention, based on a determination result of the shift determination which is made accurately by the shift determination means, it is possible to control the output torque in an appropriate manner using an output control means.

According to a third exemplary aspect of the invention, the output torque of the first drive unit can be increased in a comparatively more stable manner.

According to a fourth exemplary aspect of the invention, the engine rotational speed and the engine torque are suitably regulated. For example, the engine rotational speed may be decreased and the engine torque may be increased so that operation takes place relatively close to a best fuel economy curve in an engine efficiency map.

According to a fifth exemplary aspect of the invention, the engine torque and the second motor torque, which are controlled to have a different balance during shifting, are swiftly restored to the original states before shifting. The large engine torque is decreased to minimize fuel consumption, and thus, fuel economy is good.

According to a sixth exemplary aspect of the invention, as an example, let it be assumed that the shift control means uses an accelerator opening amount and a vehicle speed as predetermined states for making the shift determinations. If the accelerator opening amount changes rapidly, and it is determined that the driver is requesting rapid acceleration, the shift control means immediately makes a shift determination in the shift determination mode for actual shifting so as to quickly performing shifting in response to the driver's urgent request. However, if the accelerator opening amount changes slowly, and it is determined that the driver is not requesting rapid acceleration, the shift control means makes a preliminary shift determination in the preliminary shift determination mode, and then, makes a shift determination in the shift determination mode for actual shifting. Accordingly, shifting is performed stably in response to the driver's request.

According to a seventh exemplary aspect of the invention, when the driver requests rapid acceleration, shifting can be carried out promptly in response to the driver's request.

According to an eighth exemplary aspect of the invention, the torque of the first drive unit and the torque of the second drive unit are output with an appropriate balance, and an output torque that accords with the driver request torque is swiftly achieved.

The invention is not limited to the aforementioned embodiments, and various modifications based on the purpose of the invention are possible, which are regarded as within the scope of the invention.

What is claimed is:

1. A control unit for a vehicle, comprising:
   a controller that:
      determines whether shifting of a stepped transmission is necessary; and
      increases output torque of a first drive unit and decreases output torque of a second drive unit in correspondence with an increase of the output torque of the first drive unit, the increase and the decrease being performed prior to shifting of the stepped transmission when a determination is made that shifting is necessary, wherein the first drive unit includes a first motor and a power distribution apparatus that outputs a driving force from an engine and the first motor to a driving wheel and the second drive unit includes a second motor and the stepped transmission that is interposed between the second motor and the driving wheel.

2. The control unit for the vehicle according to claim 1, wherein the controller:
   determines whether shifting is necessary based on a driver request torque and a running state of the vehicle; and
   prior to shifting of the stepped transmission, at least one of (i) increases the output torque of the first drive unit by increasing a reaction force generated by the first motor of the first drive unit to engine torque generated by the engine, and (ii) decreases the output torque of the second drive unit by decreasing torque of the second motor of the second drive unit in correspondence with the increase of the output torque of the first drive unit.

3. The control unit for the vehicle according to claim 2, wherein the controller increases the reaction force generated by the first motor to the engine torque and changes an engine operating point such that the output torque of the first drive unit is increased.

4. The control unit for the vehicle according to claim 3, wherein the controller:
   stores an engine efficiency map in which a plurality of the engine operating points are defined, each of the engine operating points achieving a fuel economy state that is optimal given a rotational speed of the engine;
   selects one of the engine operating points from the engine efficiency map; and
   performs a control operation to achieve a target engine torque and a target engine rotational speed for each of the first motor and the engine such that the engine operating point is changed to a selected engine operating point.

5. The control unit for the vehicle according to claim 4, wherein, after shifting of the stepped transmission is completed, the controller performs a restoration control that restores torque for each of the first motor, the second motor, and the engine such that torque for each of the first motor, the second motor, and the engine is restored based on the engine operating point of the engine efficiency map before shifting.

6. The control unit for the vehicle according to claim 5, wherein the controller can be operated in a shift determination mode for making a shift determination for actual shifting, and a preliminary shift determination mode for making a preliminary shift determination prior to the shift determination in the shift determination mode.

7. The control unit for the vehicle according to claim 6, wherein if a change in an accelerator opening amount used for determining the driver request torque is a threshold value or greater, the controller inhibits (i) increase of the output torque of the first drive unit and (ii) decrease of the output torque of the second drive unit.

8. The control unit for the vehicle according to claim 7, wherein the controller performs control such that a total output torque of the output torque the first drive unit and the output torque of the second drive unit is equal to the driver request torque.

9. The control unit for the vehicle according to claim 5, wherein if a change in an accelerator opening amount used for determining the driver request torque is a threshold value or greater, the controller inhibits (i) increase of the output torque of the first drive unit and (ii) decrease of the output torque of the second drive unit.

10. The control unit for the vehicle according to claim 5, wherein the controller performs control such that a total output torque of the output torque the first drive unit and the output torque of the second drive unit is equal to the driver request torque.

11. The control unit for the vehicle according to claim 4, wherein if a change in an accelerator opening amount used for determining the driver request torque is a threshold value or greater, the controller inhibits (i) increase of the output torque of the first drive unit and (ii) decrease of the output torque of the second drive unit.

12. The control unit for the vehicle according to claim 3, wherein if a change in an accelerator opening amount used for determining the driver request torque is a threshold value or greater, the controller inhibits (i) increase of the output torque of the first drive unit and (ii) decrease of the output torque of the second drive unit.

13. The control unit for the vehicle according to claim 2, wherein if a change in an accelerator opening amount used for determining the driver request torque is a threshold value or greater, the controller inhibits (i) increase of the output torque of the first motor and (ii) decrease of the output torque of the second motor.

14. The control unit for the vehicle according to claim 13, wherein the controller performs control such that a total output torque of the output torque the first drive unit and the output torque of the second drive unit is equal to the driver request torque.

15. The control unit for the vehicle according to claim 1, wherein the controller increases a reaction force generated by the first motor of the first drive unit to engine torque generated by the engine and changes an engine operating point such that the output torque of the first drive unit is increased.

16. The control unit for the vehicle according to claim 15, wherein the controller:
   stores an engine efficiency map in which a plurality of the engine operating points are defined, each of the engine operating points achieving a fuel economy state that is optimal given a rotational speed of the engine,
   selects one of the engine operating points from the engine efficiency map, and
   performs a control operation to achieve a target engine torque and a target engine rotational speed for each of the first motor and the engine such that the engine operating point is changed to the selected engine operating point.

17. The control unit for the vehicle according to claim 1, wherein the controller can be operated in a shift determination mode for making a shift determination for actual shifting, and a preliminary shift determination mode for making a preliminary shift determination prior to the shift determination in the shift determination mode.

18. The control unit for the vehicle according to claim 17, wherein if a change in an accelerator opening amount used for is a threshold value or greater, the controller inhibits (i) increase of the output torque of the first drive unit and (ii) decrease of the output torque of the second drive unit.

19. A method of operating a first drive unit having a first motor and a power distribution apparatus for outputting a driving force from an engine and the first motor to a driving wheel, and a second drive unit having a second motor and a stepped transmission interposed between the second motor and the driving wheel, comprising:
   determining whether shifting of the stepped transmission is necessary; and
   increasing output torque of the first drive unit and decreasing output torque of the second drive unit in correspondence with an increase of the output torque of the first drive unit, the increase and the decrease being performed prior to shifting of the stepped transmission when a determination is made that shifting is necessary.

20. The method according to claim 19, wherein a reaction force generated by the first motor to an engine torque generated by the engine is increased and an engine operating point is changed such that the output torque of the first drive unit is increased.

21. The method according to claim 19, wherein:
   an engine efficiency map is stored in which a plurality of engine operating points are defined, each of the engine operating points achieving a fuel economy state that is optimal given a rotational speed of the engine;

one of the engine operating points is selected from the engine efficiency map; and a control operation is performed to achieve a target engine torque and a target engine rotational speed for each of the first motor and the engine such that the engine operating point is changed to a selected engine operating point.

22. The method according to claim 21, wherein, after shifting of the stepped transmission is completed, a restoration control is performed that restores torque for each of the first motor, the second motor, and the engine such that torque for each of the first motor, the second motor, and the engine is restored based on the engine operating point of the engine efficiency map before shifting.

23. The method according to claim 19, wherein if a change in an accelerator opening amount is a threshold value or greater, (i) increase of the output torque of the first drive unit is inhibited and (ii) decrease of the output torque of the second drive unit is inhibited.

24. A control unit for a vehicle, comprising:
means for determining whether shifting of a stepped transmission is necessary; and
means for increasing output torque of a first drive unit and decreasing output torque of a second drive unit in correspondence with an increase of the output torque of the first drive unit, the increase and the decrease being performed prior to shifting of the stepped transmission when a determination is made that shifting is necessary, wherein the first drive unit includes a first motor and a power distribution apparatus that outputs a driving force from an engine and the first motor to a driving wheel and the second drive unit includes a second motor and the stepped transmission that is interposed between the second motor and the driving wheel.

25. The control unit for the vehicle according to claim 24, wherein a reaction force generated by the first motor of the first drive unit to an engine torque generated by the engine is increased and an engine operating point is changed such that the output torque of the first drive unit is increased.

26. The control unit for the vehicle according to claim 24, wherein:
an engine efficiency map is stored in which a plurality of engine operating points are defined, each of the engine operating points achieving a fuel economy state that is optimal given a rotational speed of the engine;
one of the engine operating points is selected from the engine efficiency map; and
a control operation is performed to achieve a target engine torque and a target engine rotational speed for each of the first motor of the first drive unit and the engine such that the engine operating point is changed to a selected engine operating point.

27. The control unit for the vehicle according to claim 26, wherein, after shifting of the stepped transmission is completed, a restoration control is performed that restores torque for each of the first motor the second motor of the second drive unit, and the engine such that torque for each of the first motor, the second motor, and the engine is restored based on the engine operating point of the engine efficiency map before shifting.

28. The control unit for the vehicle according to claim 24, wherein if a change in an accelerator opening amount is a threshold value or greater, (i) increase of the output torque of the first motor is inhibited and (ii) decrease of the output torque of the second drive unit is inhibited.

29. A hybrid vehicle, comprising:
a first drive unit having a first motor and a power distribution apparatus for outputting a driving force from an engine and the first motor to a driving wheel;
a second drive unit having a second motor and a stepped transmission interposed between the second motor and the driving wheel; and
a controller that:
determines whether shifting of the stepped transmission is necessary; and
increases output torque of the first drive unit and decreases output torque of the second drive unit in correspondence with an increase of the output torque of the first drive unit, the increase and the decrease being performed prior to shifting of the stepped transmission when a determination is made that shifting is necessary.

30. The vehicle according to claim 29, wherein the controller increases a reaction force generated by the first motor to the engine torque and changes an engine operating point such that the output torque of the first drive unit is increased.

31. The vehicle according to claim 29, wherein the controller:
stores an engine efficiency map in which a plurality of the engine operating points are defined, each of the engine operating points achieving a fuel economy state that is optimal given a rotational speed of the engine;
selects one of the engine operating points from the engine efficiency map; and
performs a control operation to achieve a target engine torque and a target engine rotational speed for each of the first motor and the engine such that the engine operating point is changed to a selected engine operating point.

32. The vehicle according to claim 31, wherein, after shifting of the stepped transmission is completed, the controller performs a restoration control that restores torque for each of the first motor, the second motor, and the engine such that torque for each of the first motor, the second motor, and the engine is restored based on the engine operating point of the engine efficiency map before shifting.

33. The vehicle according to claim 29, wherein if a change in an accelerator opening amount is a threshold value or greater, the controller inhibits (i) increase of the output torque of the first drive unit and (ii) decrease of the output torque of the second drive unit.

* * * * *